(12) United States Patent
Onoue

(10) Patent No.: US 9,614,812 B2
(45) Date of Patent: Apr. 4, 2017

(54) CONTROL METHODS AND SYSTEMS FOR IMPROVING VIRTUAL MACHINE OPERATIONS

(71) Applicant: FUJITSU LIMITED, Kawasaki-shi, Kanagawa (JP)

(72) Inventor: Koichi Onoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 14/483,606

(22) Filed: Sep. 11, 2014

(65) Prior Publication Data

US 2015/0134777 A1    May 14, 2015

(30) Foreign Application Priority Data

Nov. 12, 2013   (JP) ................................ 2013-234458

(51) Int. Cl.
| | |
|---|---|
| H04L 29/06 | (2006.01) |
| G06F 9/455 | (2006.01) |
| H04L 29/08 | (2006.01) |
| H04L 12/24 | (2006.01) |

(52) U.S. Cl.
CPC ...... *H04L 63/0281* (2013.01); *G06F 9/45558* (2013.01); *H04L 41/0803* (2013.01); *H04L 63/0236* (2013.01); *H04L 67/1002* (2013.01)

(58) Field of Classification Search
CPC . H04L 67/10; H04L 63/0281; H04L 63/0236; G06F 9/45558
See application file for complete search history.

(56) References Cited

U.S. PATENT DOCUMENTS

| | | | | |
|---|---|---|---|---|
| 7,693,158 B1* | 4/2010 | Carrie | ................. | H04L 12/4641 370/395.53 |
| 7,756,146 B2* | 7/2010 | Hato | .................... | H04L 12/4641 370/395.53 |
| 8,054,832 B1* | 11/2011 | Shukla | ..................... | H04L 45/00 370/230 |
| 8,385,356 B2* | 2/2013 | Armstrong | ............ | H04L 45/586 370/392 |
| 8,464,335 B1* | 6/2013 | Sinha | ...................... | G06F 21/51 713/153 |
| 9,065,766 B2* | 6/2015 | Matsuoka | ............... | H04L 49/70 |
| 9,356,906 B2* | 5/2016 | Thakkar | .................. | H04L 47/12 |
| 9,531,676 B2* | 12/2016 | Wang | .................. | H04L 63/0281 |
| 9,548,965 B2* | 1/2017 | Wang | .................. | H04L 63/0281 |
| 2007/0101020 A1* | 5/2007 | Lin | ........................ | H04L 1/1825 709/238 |
| 2007/0217364 A1* | 9/2007 | Kawakami | .......... | H04L 12/4679 370/331 |

(Continued)

FOREIGN PATENT DOCUMENTS

| | | |
|---|---|---|
| JP | 2011-171874 | 9/2011 |
| JP | 2012-244621 | 12/2012 |

*Primary Examiner* — Jimmy H Tran
(74) *Attorney, Agent, or Firm* — Staas & Halsey LLP

(57) ABSTRACT

A method for improving the operations and efficiency of virtual machine management. In one embodiment, the method includes storing identification information of a user and a first computer executing software that is related to a virtual machine. Next, a third computer that is already executing software of a target user is identified. And finally, a second computer transmits, to the third computer, broadcast data corresponding to the software of the target user.

16 Claims, 36 Drawing Sheets

(56) References Cited

U.S. PATENT DOCUMENTS

| | | | |
|---|---|---|---|
| 2007/0286093 A1* | 12/2007 | Cai | H04L 45/16 |
| | | | 370/254 |
| 2008/0002703 A1* | 1/2008 | Tripathi | H04L 12/42 |
| | | | 370/392 |
| 2008/0028071 A1* | 1/2008 | Miyajima | H04L 29/12028 |
| | | | 709/224 |
| 2009/0073980 A1* | 3/2009 | Matsumoto | H04L 12/1886 |
| | | | 370/392 |
| 2011/0075664 A1* | 3/2011 | Lambeth | H04L 45/04 |
| | | | 370/390 |
| 2011/0191402 A1* | 8/2011 | Imai | G06F 9/455 |
| | | | 709/201 |
| 2011/0202920 A1* | 8/2011 | Takase | G06F 9/45558 |
| | | | 718/1 |
| 2011/0205904 A1* | 8/2011 | Nakagawa | H04L 12/18 |
| | | | 370/241 |
| 2012/0294192 A1* | 11/2012 | Masood | H04L 12/4645 |
| | | | 370/255 |
| 2012/0331142 A1* | 12/2012 | Mittal | H04L 49/354 |
| | | | 709/225 |
| 2014/0052877 A1* | 2/2014 | Mao | H04L 61/103 |
| | | | 709/245 |

\* cited by examiner

FIG. 5

| TENANT ID | VM PORT ID |
|---|---|
| 1 | 1,5,6 |
| 2 | 2,7 |
| 3 | 10 |

FIG. 6

| TENANT ID | PHYSICAL MACHINE ID |
|---|---|
| 1 | 3,4 |
| 2 | 3,4,5 |
| 3 | 5 |

FIG. 7

| TENANT ID | VM PORT ID |
|---|---|
| 1 | 1 |
| 2 | 2 |

FIG. 8

| TENANT ID | PHYSICAL MACHINE ID |
|---|---|
| 1 | 4 |
| 2 | 4,5 |

FIG. 9

| TUNNEL PORT ID | PHYSICAL MACHINE ID |
|---|---|
| 3 | 4 |
| 4 | 5 |

FIG. 10

```
1. accept srcMAC=VM1 or srcMAC=VM2 on Tunnel port 3
   accept srcMAC=VM2 on Tunnel port4
2. if inVMPort= 1 then tenantID<-1,
   if inVMPort= 2 then tenantID<-2
```

HEADER ADDED BY VM

BC: BROADCAST
PM: PHYSICAL MACHINE
MAC: MAC ADDRESS
IP: IP ADDRESS

FIG. 34

| TENANT ID | ISLAND-TENANT ID |
|---|---|
| 1 | 1 (ISLAND1), 3 (ISLAND2) |
| 2 | 3 (ISLAND1), 2 (ISLAND2) |
| 3 | 2 (ISLAND1) |

CONTROL METHODS AND SYSTEMS FOR IMPROVING VIRTUAL MACHINE OPERATIONS

CROSS-REFERENCE TO RELATED APPLICATION

This application is based upon and claims the benefit of priority of the prior Japanese Patent Application No. 2013-234458, filed on Nov. 12, 2013, the entire contents of which are incorporated herein by reference.

FIELD

The embodiments discussed herein are related to a control method, an information processing system, and a recording medium.

BACKGROUND

On a network which is structured in a data center, physical resources on the network (a physical server, a physical router, and the like, for example) are shared among multiple tenants. Such a network is referred hereinafter to as a multi-tenant network. The tenant means here a user, such as a company. In the multi-tenant network, filtering is performed by a virtual switch or the like on data transmitted by a virtual machine of some tenant, so that virtual machines of other tenants do not receive the data.

Meanwhile, one mode of transmitting data includes broadcast. The broadcast means that data is transmitted to all nodes in the same layer (L) 2 domain. A related technology discloses that filtering is performed on broadcast on a multi-tenant network as follows. Specifically, when a destination address of a received message is an address of a virtual switch, a computer converts the destination address of the received message to a broadcast address for a virtual machine which is under control of the virtual switch and belongs to the same sub-net. Then, the computer outputs the message after conversion.

However, this technology assumes that an operation of setting a virtual MAC address is performed in advance on a virtual L2 switch which is executed on a computer. The related art is disclosed in, for example, Japanese Laid-open Patent Publication No. 2011-171874.

SUMMARY

According to an aspect of the invention, a control method by an information processing system including a plurality of computers, the plurality of computer including a first computer, a second computer, and a third computer, the control method includes storing, by the first computer, identification information of a user and identification information of a computer among the plurality of computers in association with each other in a memory, the computer executing a software of the user, the software being related to a virtual machine; extracting, by the first computer, identification information of the third computer already executing the software of a target user from the memory based on identification information of the target user, when it is detected that the software of the target user is activated in the second computer and when identification information of the target user is stored in the memory; transmitting, by the first computer, the extracted identification information of the third computer to the second computer; receiving, by the second computer, the identification information of the third computer from the first computer; and allowing, by the second computer, the second computer to transmit broadcast data corresponding to the software of the target user to the third computer, when the broadcast data is received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an example diagram illustrating data stored in a first management data storage unit;

FIG. 6 is an example diagram illustrating data stored in a second management data storage unit;

FIG. 7 is an example diagram illustrating data stored in a first data storage unit;

FIG. 8 is an example diagram illustrating data stored in a second data storage unit;

FIG. 9 is an example diagram illustrating data stored in a third data storage unit;

FIG. 10 is an example diagram illustrating data stored in a policy data storage unit;

FIG. 34 is an example diagram of data stored in a third management data storage unit;

DESCRIPTION OF EMBODIMENTS

First Embodiment

Figure 1:
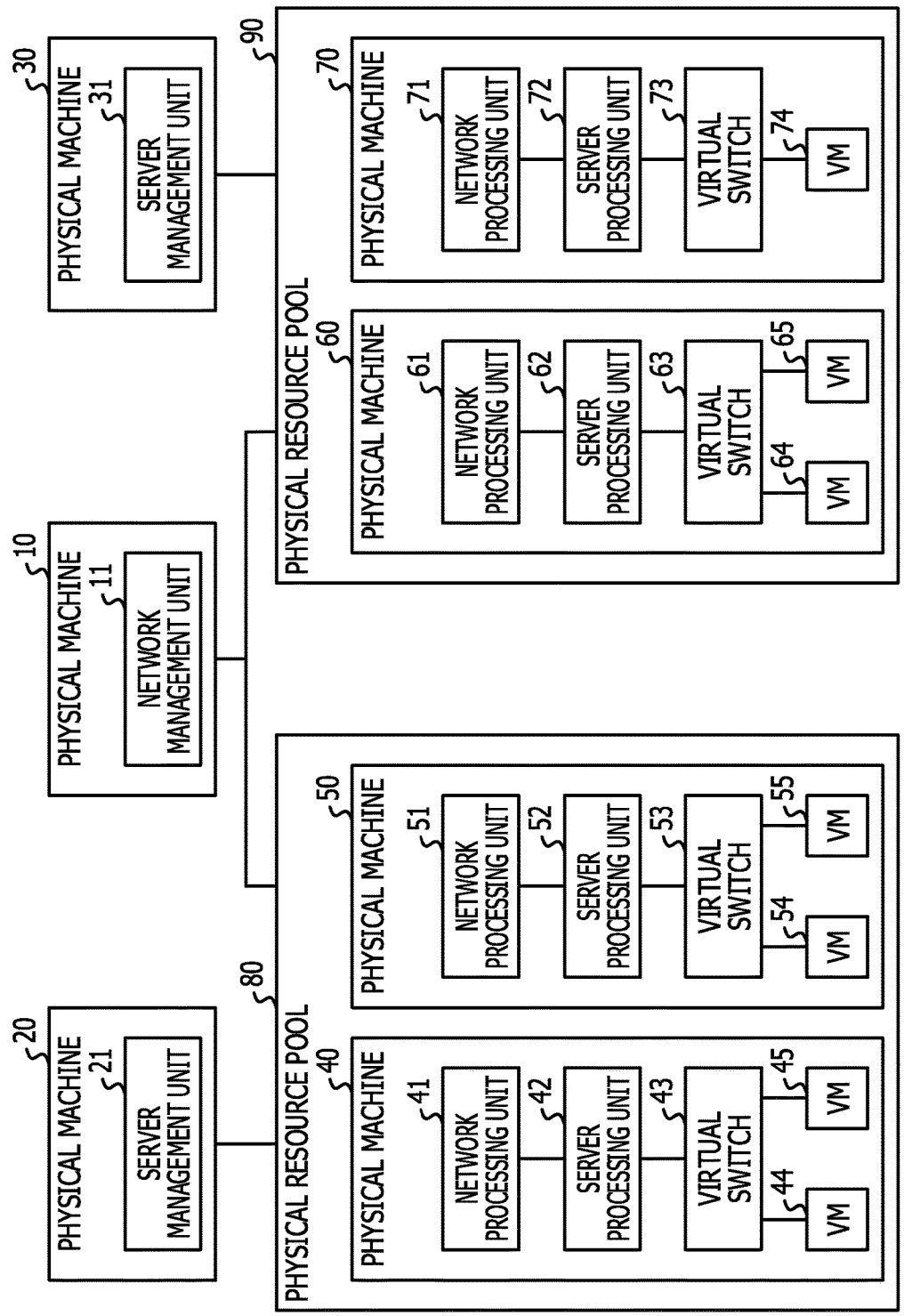
FIG. 1 is a diagram schematically illustrating a system according to the present embodiment.

FIG. 1 schematically illustrates a system in a first embodiment. A physical resource pool 80 includes physical machines 40 and 50. The physical resource pool 80 is coupled to a physical machine 20 configured to manage the physical machines 40 and 50. A physical resource pool 90 includes physical machines 60 and 70. The physical resource pool 90 is coupled to a physical machine 30 configured to manage the physical machines 60 and 70. The physical resource pools 80 and 90 are coupled to a physical machine 10 which is configured to manage communications of the physical machines 40 and 50 in the physical resource pool 80 and communications of the physical machines 60 and 70 in the physical resource pool 90. Although illustration is omitted in FIG. 1, each of the physical resource pools 80 and 90 includes physical resources such as physical switches in addition to the physical machines. In the present embodiment, tunneling (or establishment of a virtual line) is used for communications among the physical machines in the present embodiment.

The physical machine 10 includes a network management unit 11. The physical machine 20 includes a server management unit 21. The physical machine 30 includes a server management unit 31. The physical machine 40 includes a network processing unit 41, a server processing unit 42, a virtual switch 43, and virtual machines (VM) 44 and 45. The physical machine 50 includes a network processing unit 51, a server processing unit 52, a virtual switch 53, and virtual machines (VM) 54 and 55. The physical machine 60 includes a network processing unit 61, a server processing unit 62, a virtual switch 63, and virtual machines (VM) 64 and 65. The physical machine 70 includes a network processing unit 71, a server processing unit 72, a virtual switch 73, and a virtual machine (VM) 74.

The network management unit 11 and the respective network processing units in the physical machines perform such management as physical switch management (topology management, for example), virtual switch management, and firewall setting management. The server management units 21 and 31 and the respective server management units in the physical machines perform such management as physical machine management (management of a central processing unit (CPU), a memory, and a virtual machine monitor (VMM), for example) and VM management (VM arranging management, for example).

A management type of the physical resource pool 80 is different from that of the physical resource pool 90. In other words, a dedicated server management unit is assigned to each of the physical resource pools 80 and 90. However, the network management unit 11 in the present embodiment can manage communications of both the physical resource pools 80 and 90. Accordingly, the system in the present embodiment is provided with one network management unit 11. The management mechanism of the physical resource pool is provided by VMware or OpenStack, for example.

Figure 2:
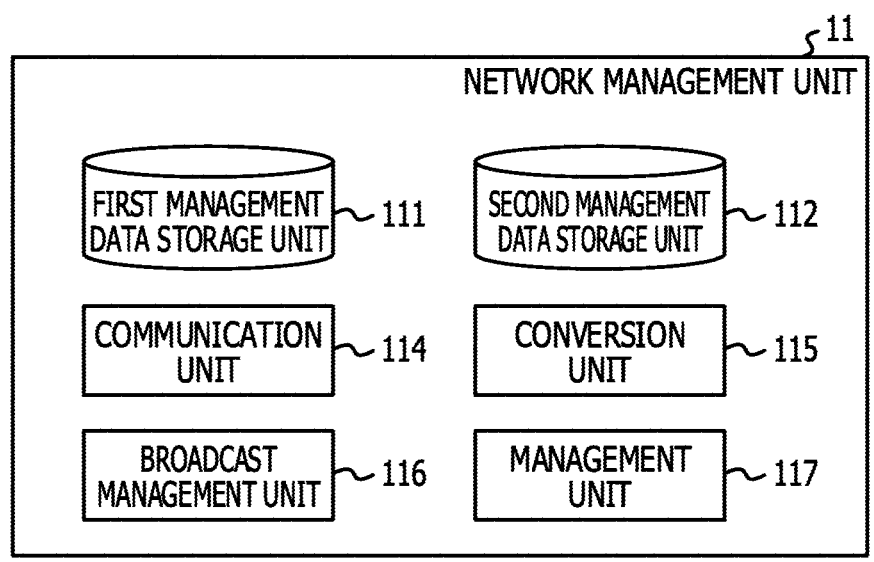
FIG. 2 is a functional block diagram of a network management unit in a first embodiment.

FIG. 2 illustrates a functional block diagram of the network management unit 11. The network management unit 11 includes a first management data storage unit 111, a second management data storage unit 112, a communication unit 114, a conversion unit 115, a broadcast management unit 116, and a management unit 117.

The communication unit 114 transmits and receives data. The conversion unit 115 converts a communication format for data to be transmitted and received. When an activation notification indicating that a VM is activated is received, the broadcast management unit 116 performs processing using data stored in the second management data storage unit 112. The broadcast management unit 116 outputs a processing result to the communication unit 114. Using the data stored in the first management data storage unit 111 and the data stored in the second management data storage unit 112, the management unit 117 manages a physical topology, a virtual topology, firewall setting, and the like.

Figure 3:
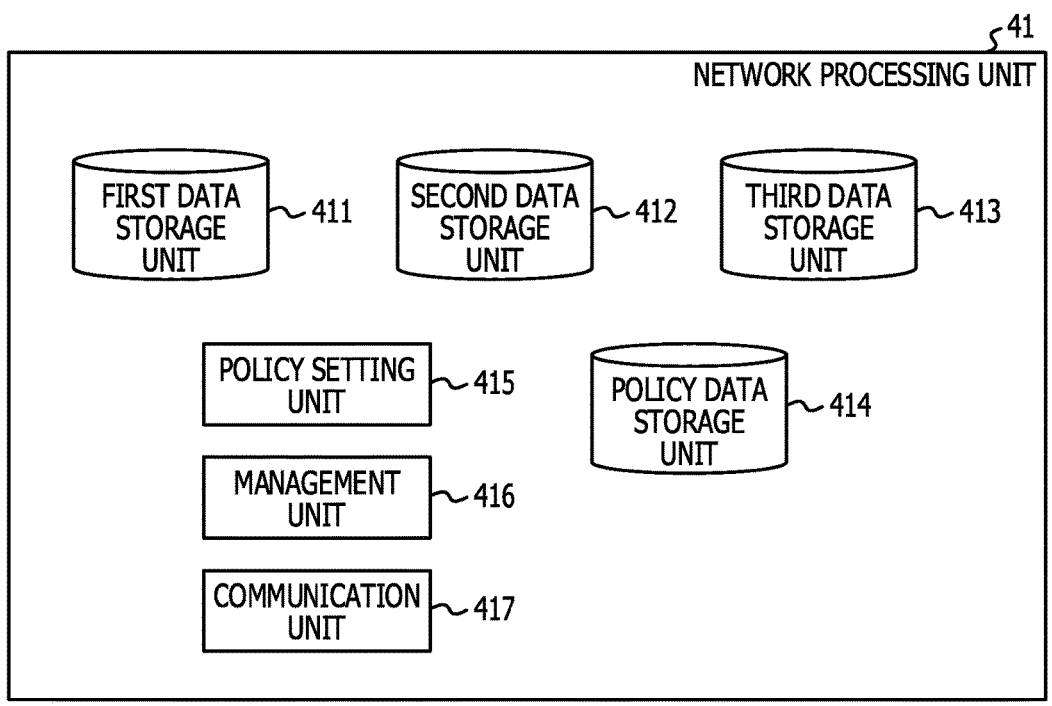
FIG. 3 is a functional block diagram of a network processing unit.

FIG. 3 illustrates a functional block diagram of the network processing unit 41. The network processing unit 41 includes a first data storage unit 411, a second data storage unit 412, a third data storage unit 413, a policy data storage unit 414, a policy setting unit 415, a management unit 416, and a communication unit 417. Functional block diagrams of the network processing units 51, 61, and 71 are the same as that of the network processing unit 41.

Using data included in an update notification which is received from the network management unit 11 and requests a data update, the policy setting unit 415 updates the data stored in the second data storage unit 412 and the data stored in the third data storage unit 413. Then, the policy setting unit 415 updates the data stored in the policy data storage unit 414. When it is detected that a VM is activated, the management unit 416 uses the first data storage unit 411 to determine if the VM is a VM which is activated for the first time in the physical machine. When it is the first activated VM, the management unit 416 outputs the processing result to the communication unit 417. When it is not the first activated VM, the management unit 416 updates the data stored in the first data storage unit 411. Then, the management unit 416 updates the data stored in the policy data storage unit 414. The communication unit 417 transmits and receives data.

Figure 4:
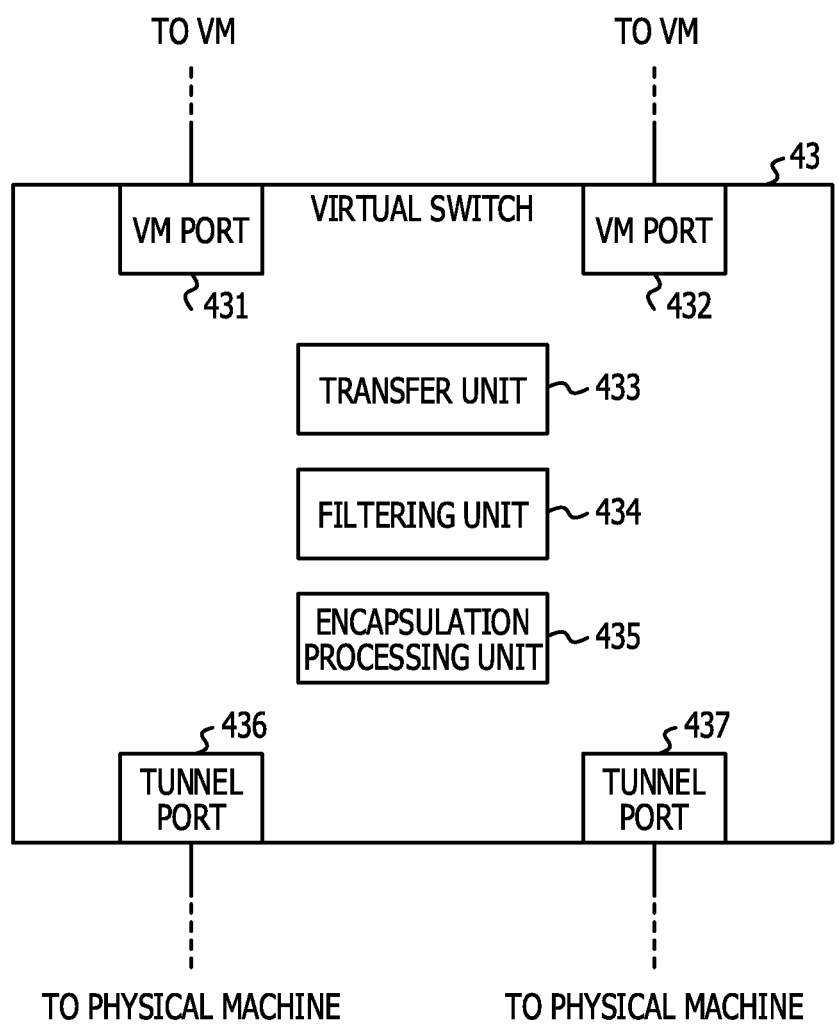
FIG. 4 is a functional block diagram of a virtual switch.

FIG. 4 illustrates a functional block diagram of the virtual switch 43. The virtual switch 43 includes VM ports 431 and 432, which are virtual ports, tunnel ports 436 and 437, a transfer unit 433, a filtering unit 434, and an encapsulation processing unit 435. Each of the VM ports 431 and 432 is coupled to a VM. Each of the tunnel ports 436 and 437 is coupled to a physical machine. Functional block diagrams of the virtual switches 53, 63, and 73 are same as that of the virtual switch 43.

The transfer unit 433 executes processing of determining a port in a transfer destination based on an MAC address of the received data in a transmission source. The filtering unit 434 performs filtering (or transmission destination selection) of data to be transmitted based on the data stored in the policy data storage unit 414 in the network processing unit 41. The encapsulation processing unit 435 executes processing of adding a header including a tenant ID to the data to be transmitted (or encapsulation) based on the data stored in the policy data storage unit 414 in the network processing unit 41.

Figure 5:
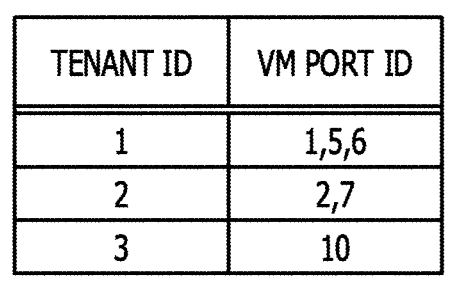

FIG. 5 illustrates example data stored in the first management data storage unit 111 of the network management unit 11. In the example of FIG. 5, tenant IDs and VM port IDs are stored in the first management data storage unit 111. The tenant ID is identification information of a tenant. The VM port ID is identification information of a virtual port in a virtual switch, to which a VM on a physical machine is coupled.

Figure 6:
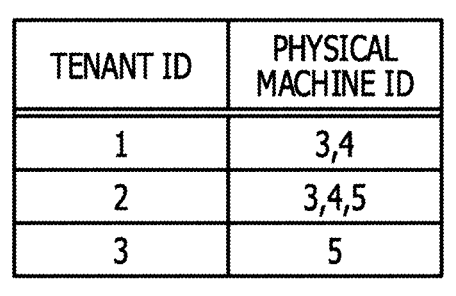

FIG. 6 illustrates example data stored in the second management data storage unit 112 of the network management unit 11. In the example of FIG. 6, tenant IDs and physical machine IDs are stored. The physical machine ID is identification information of a physical machine.

Figure 7:
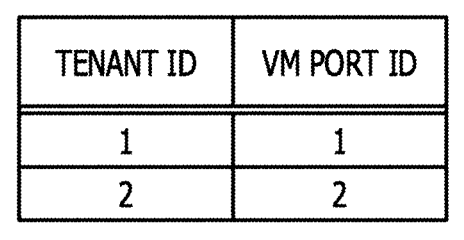

FIG. 7 illustrates example data stored in the first data storage unit 411 of the network processing unit 41. In the example of FIG. 7, tenant IDs and VM port IDs are stored.

Figure 8:
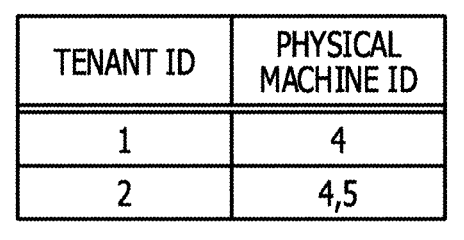

FIG. 8 illustrates example data stored in the second data storage unit 412 of the network processing unit 41. In the example of FIG. 8, tenant IDs and physical machine IDs are stored. The physical machine ID stored in the second data storage unit 412 is an ID of a physical machine to execute a VM in the same tenant.

Figure 9:
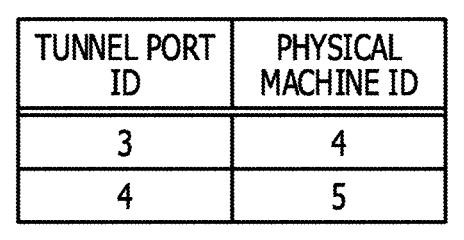

FIG. 9 illustrates example data stored in the third data storage unit 413 of the network processing unit 41. In the example of FIG. 9, tunnel port IDs and physical machine IDs are stored. The tunnel port ID is an ID of a physical port provided in the physical machine. The physical machine ID stored in the third data storage unit 413 is an ID of a physical machine beyond a tunnel (or a virtual line).

FIG. 10 illustrates example data stored in the policy data storage unit 414 of the network processing unit 41. In the example of FIG. 10, data indicating a tunnel port in a broadcast transfer destination for each transmission source MAC address and data indicating a tenant ID to be added for each VM port are stored. In the example of FIG. 10, the former data indicates transfer to the tunnel port 3 when the broadcast transmission source MAC address is a MAC address of the VM 1 and transfer to the tunnel port 3 and the tunnel port 4 when the broadcast transmission source MAC address is a MAC address of the VM 2. The latter data indicates that a tenant ID 1 is added to the data from the VM coupled to the VM port 1 and a tenant ID 2 is added to the data from the VM coupled to the VM port 2.

Figure 11:
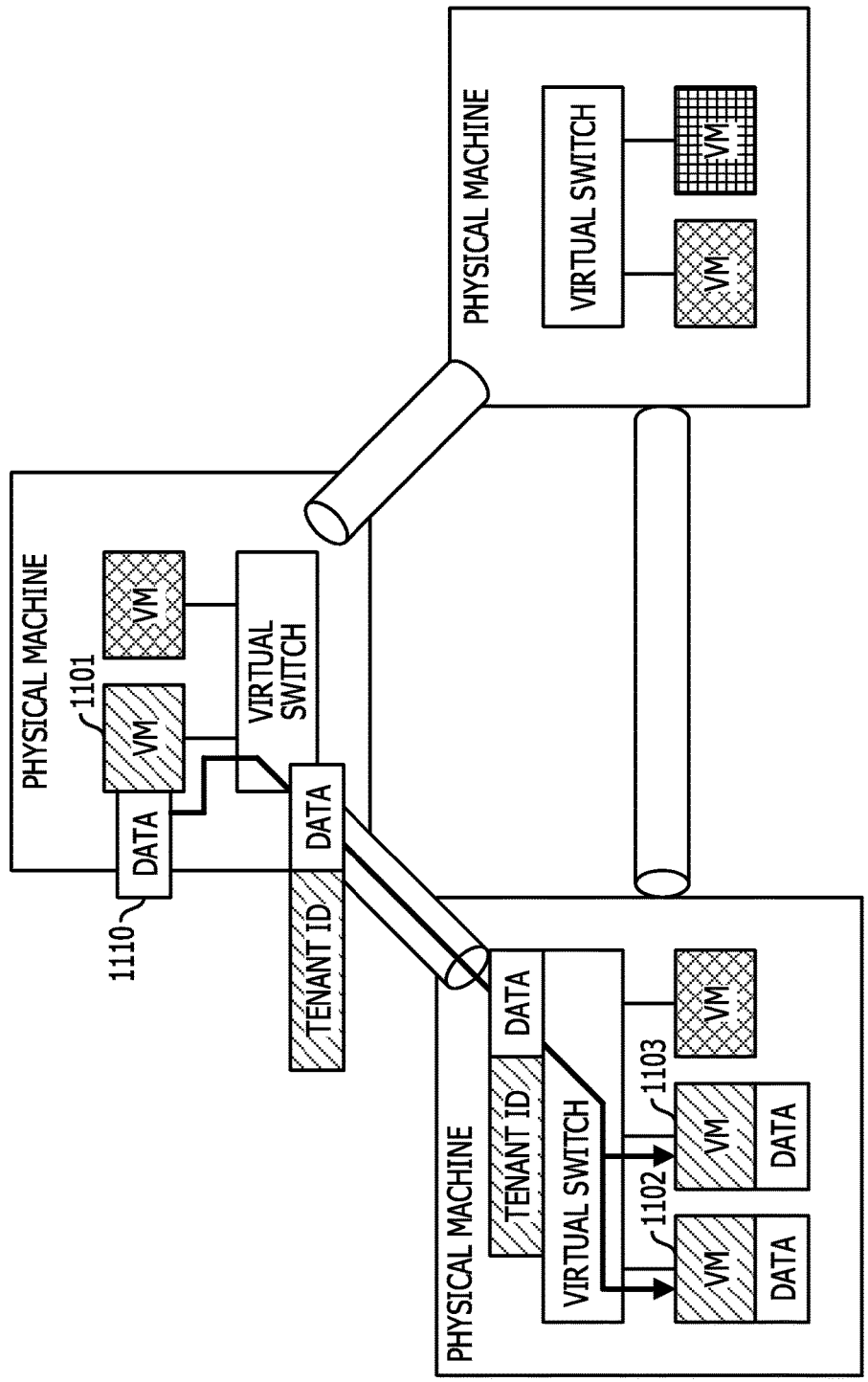
FIG. 11 is a diagram illustrating data transfer in the present embodiment.

FIG. 11 illustrates data transfer in the present embodiment. In the example of FIG. 11, three physical machines are coupled to one another. Then, tunnels are established among the physical machines. A tubular figure expresses a tunnel and same hatching is given to VMs in the same tenant. In FIG. 11, a VM 1101 transmits data 1110. A header including a tenant ID is added to the data 1110 in the virtual switch and the data 1110 is transmitted from the tunnel port. However, the data 1110 is not transmitted from a tunnel port coupled to a physical machine which does not execute a VM in the same tenant. The header added to the data 1110 is removed in the virtual switch of the physical machine in the transmission destination. The header added to the data 1110 is transferred to VMs 1102 and 1103 whose tenant ID is 1.

Figure 12:
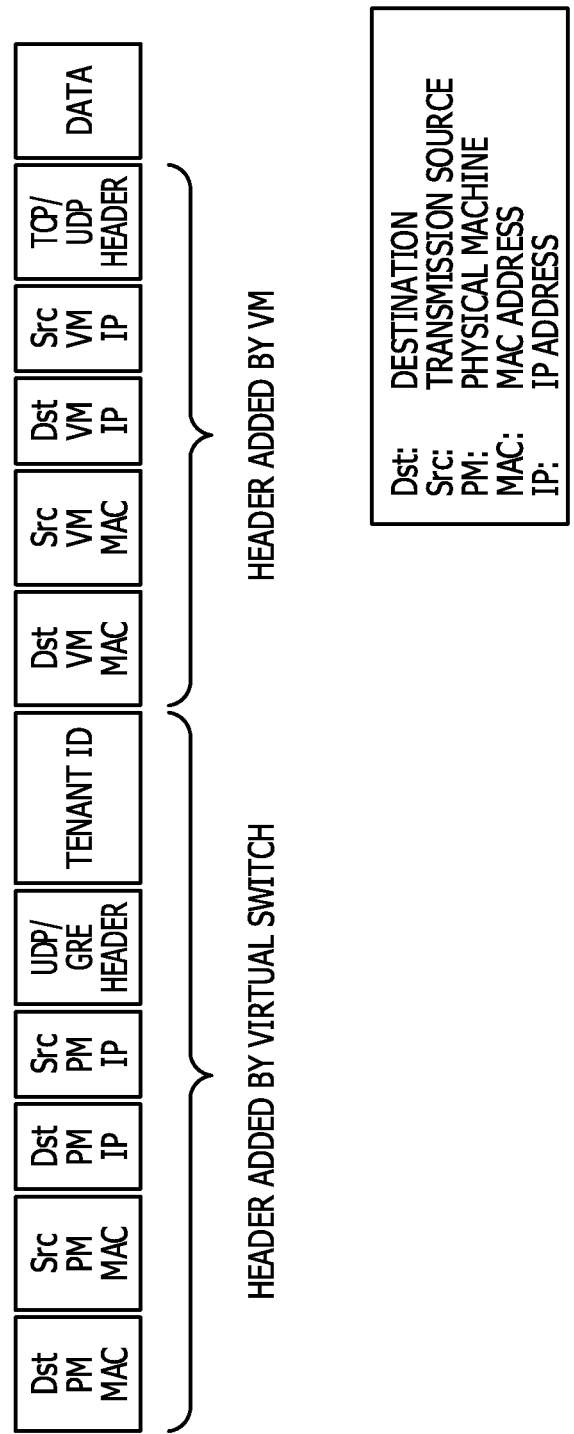
FIG. 12 is an example diagram illustrating data to be transferred.

FIG. 12 illustrates example data to be transferred. In the example of FIG. 12, the data to be transferred includes a MAC address of a destination physical machine, a MAC address of a transmission source physical machine, an IP address of a destination physical machine, an IP address of a transmission source physical machine, a user datagram protocol (UDP) header or a generic routing encapsulation (GRE) header, a tenant ID, a MAC address of a destination VM, a MAC address of a transmission source VM, an IP address of a destination VM, an IP address of a transmission source VM, a transmission control protocol (TCP) header or a UDP header, and data. The header added by the virtual switch includes a MAC address of a destination physical machine, a MAC address of a transmission source physical machine, an IP address of a destination physical machine, an IP address of a transmission source physical machine, a user datagram protocol (UDP) header or a generic routing encapsulation (GRE) header, and a tenant ID. The header added by the VM includes a MAC address of a destination VM, a MAC address of a transmission source VM, an IP address of a destination VM, an IP address of a transmission source VM, and a TCP header or a UDP header.

Figure 13:
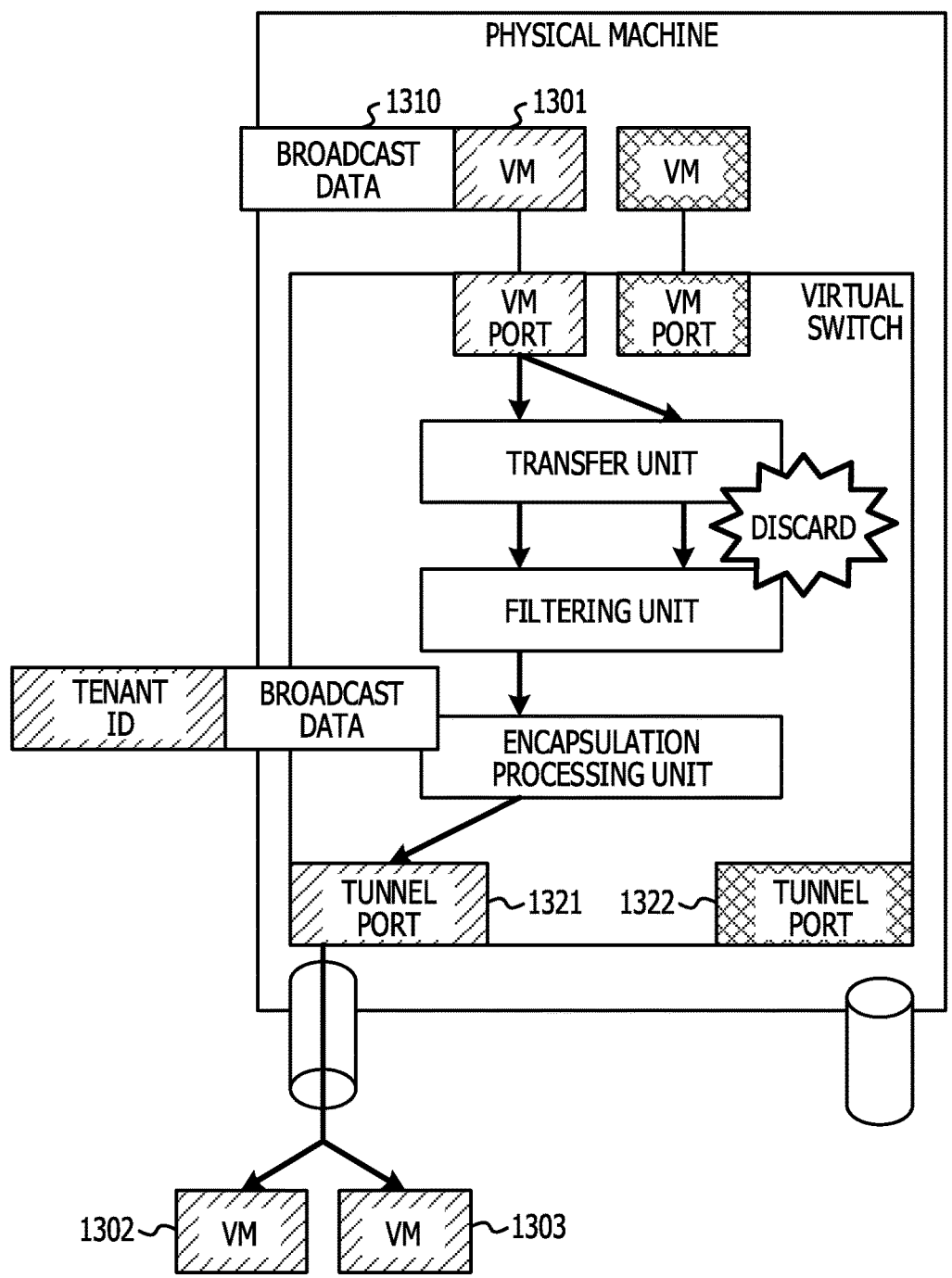
FIG. 13 is an example diagram illustrating processing of a virtual switch, which is performed on broadcast data.

FIG. 13 illustrates processing of a virtual switch, which is performed on broadcast data. In the example of FIG. 13, a tubular figure expresses a tunnel and same hatching is given to VMs in the same tenant. A VM 1301 transmits broadcast data 1310. The transfer unit receives the broadcast data from the VM port to which the VM 1301 is coupled. Then, the transfer unit determines a transfer destination of the broadcast data. Here, since a transmission destination MAC address is a broadcast MAC address, all the tunnel ports can be the transmission destinations. However, based on policies stored in the policy data storage unit, the filtering unit discards the broadcast data to the tunnel port 1322 which is not coupled to the physical machine to execute VMs in the same tenant. The encapsulation processing unit adds a header including a tenant ID to the broadcast data 1310 and outputs the broadcast data 1310 to the tunnel port 1321. Accordingly, the broadcast data is transmitted only to the VMs in the same tenant.

Figure 14:
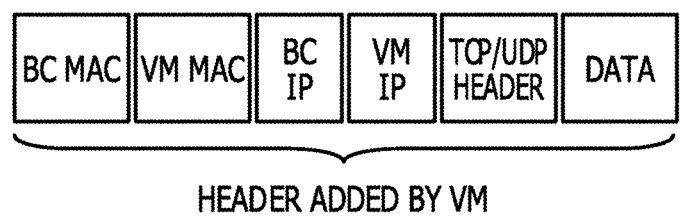
FIG. 14 is an example diagram illustrating a header which is added by a VM during broadcasting.

FIG. 14 illustrates an example heater which is added by a VM at the time of the broadcast in the example of FIG. 13. In the example of FIG. 14, the header includes a broadcast MAC address, a VM MAC address, a broadcast IP address, a VM IP address, and a TCP header or a UDP header.

Figure 15:
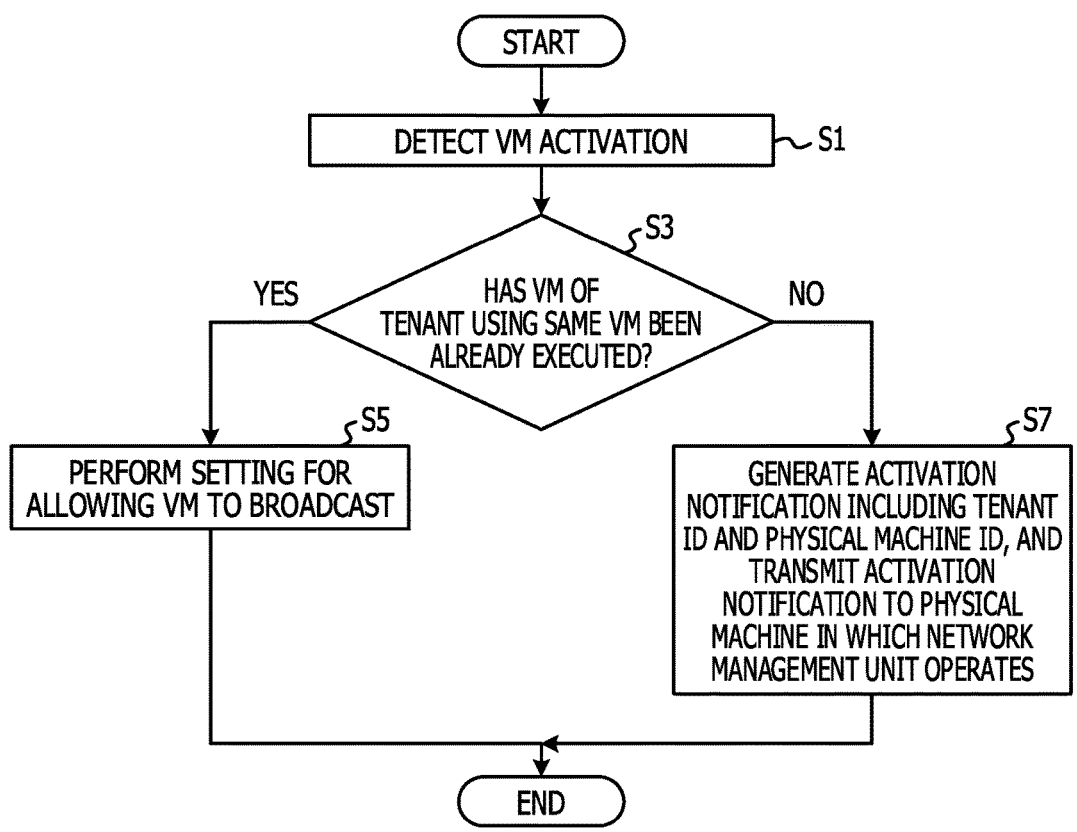
FIG. 15 is a flowchart of processing to be executed when a network processing unit detects activation of the VM.
Figure 16:
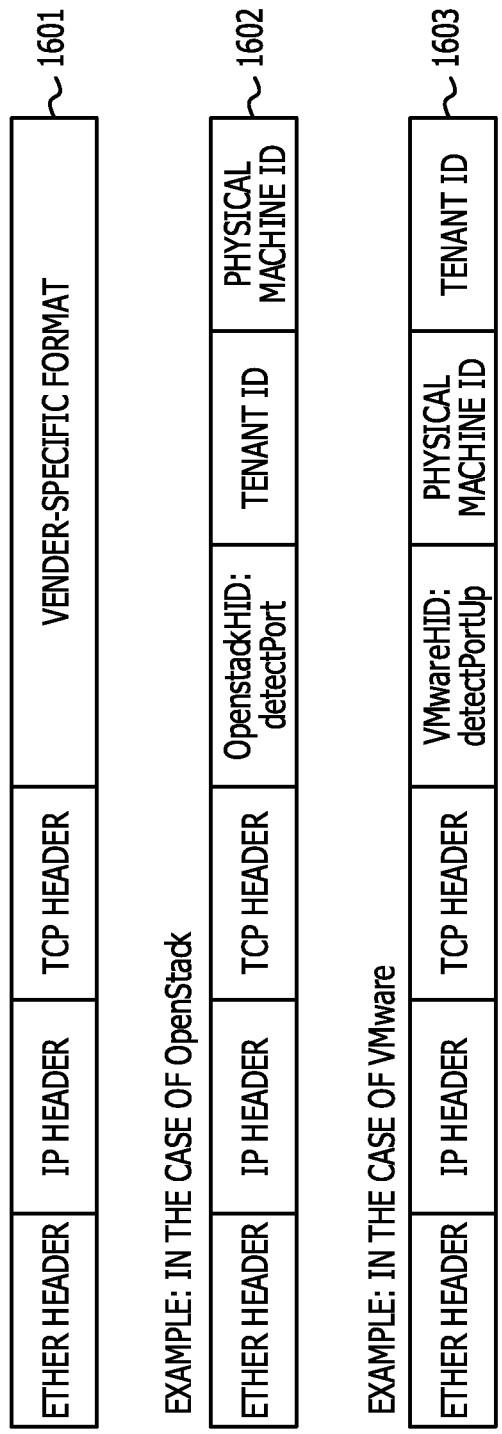
FIG. 16 is an example diagram of an activation notification.

Next, processing to be performed in the system illustrated in FIG. 1 is described by referring to FIGS. 15 to 32. First of all, described by using FIGS. 15 and 16 is processing to be executed when the network processing unit 41 detects that a VM is activated. The processing performed by the network processing unit 41 is illustrated as an example here, but the network processing units 51, 61, and 71 also perform the same processing.

The management unit 416 in the network processing unit 41 detects that a VM is newly activated in the physical machine 40 (FIG. 15: S1). Depending on if a VM port ID associated with a tenant ID of a tenant using the activated VM exists in the first data storage unit 411, the management unit 416 determines if the VM of that tenant is already executed (S3).

When the VM of the tenant is already executed (S3: Yes route), the management unit 416 instructs the policy setting unit 415 to execute the processing. In response to this, the policy setting unit 415 performs setting on the policy data storage unit 414 for allowing the broadcasting performed by the activated VM (S5). Specifically, a MAC address of the activated VM and a tunnel port ID of a tunnel port in a broadcast transfer destination (here, the tunnel port ID means one already executed and registered for the MAC address of the VM in the same tenant) are registered in a field of "1." in the data illustrated in FIG. 10. After that, the processing is terminated.

On the other hand, when the VM of the tenant has not been executed (S3: No route), the management unit 416 generates an activation notification which includes the tenant ID of the tenant using the activated VM and the physical machine ID of the physical machine (here, the physical machine 40) executing the activated VM and outputs the activation notification to the communication unit 417. In response to this, the communication unit 417 transmits the activation notification to the physical machine (here, the physical machine 10) in which the network management unit 11 is operated (S7). After that, the processing is terminated.

With the execution of the above-described processing, the network management unit 11 becomes capable of detecting that a VM is newly activated.

FIG. 16 illustrates an example activation notification. Data 1601 in FIG. 16 is an example activation notification. The activation notification includes an ether header, an IP header, a TCP header, and data in a vendor-specific format. When the management mechanism type of the physical resource pool is OpenStack, as the data 1602, for example, the data in a vender-specific format data includes an OpenstackHID and a tenant ID, and a physical machine ID, which are identification information to identify the processing. In the OpenstackHID, "detectPort" is set. When the management mechanism type of the physical resource pool is VMware, as the data 1603, for example, the data in a vender-specific format includes VMwareHID, a physical machine ID, and a tenant ID, which are identification information to identify the processing. In the VMwareHID, "detectPortUP" is set.

Figure 17:
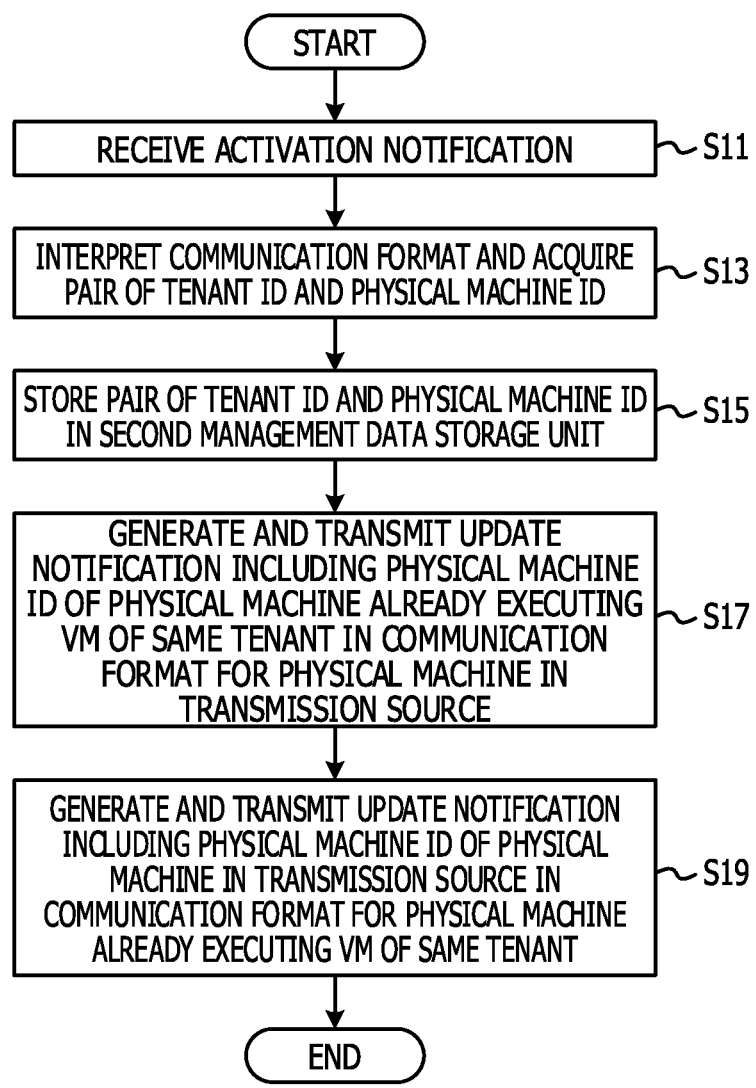
FIG. 17 is a flowchart of processing in the first embodiment, which is executed when the network management unit receives the activation notification.
Figure 18:
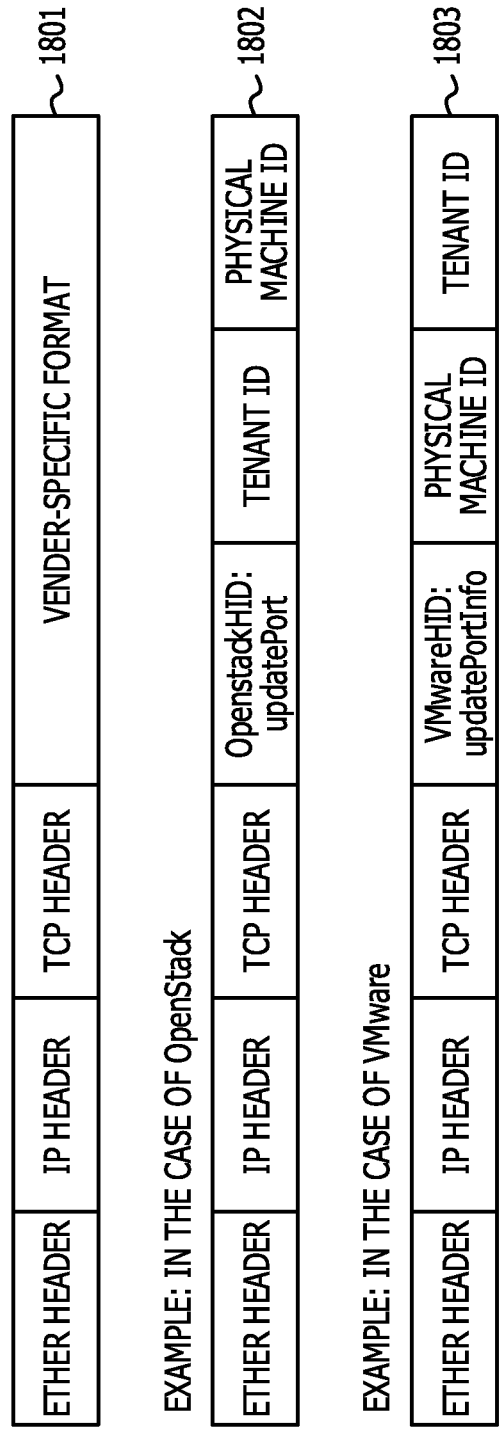
FIG. 18 is an example diagram of an update notification.

Hereinafter, described by referring to FIGS. 17 and 18 is processing which is executed when the network management unit 11 receives the activation notification.

The communication unit 114 in the network management unit 11 receives the activation notification (FIG. 17: S11) and outputs it to the conversion unit 115. Then, the conversion unit 115 interprets a communication format of the activation notification and acquires a pair of the tenant ID and the physical machine ID from the activation notification (S13). The conversion unit 115 outputs the acquired pair of the tenant ID and physical machine ID to the broadcast management unit 116.

The broadcast management unit 116 stores the acquired pair of the tenant ID and the physical machine ID in the second management data storage unit 112 (S15). When the same tenant ID is already stored in the second management data storage unit 112, the broadcast management unit 116 reads out the physical machine ID stored in association with the tenant ID and stores the acquired physical machine ID in association with the tenant ID. The broadcast management unit 116 generates, in a communication format for the physical machine in the transmission source of the activation notification, an update notification including the read physical machine ID (or the physical machine ID of the physical machine already executing a VM in the same tenant). Then, the broadcast management unit 116 transmits the generated update notification to the transmission source physical machine (S17). When the same tenant ID is not stored in the second management data storage unit 112, the broadcast management unit 116 generates an update notification without a physical machine ID.

The broadcast management unit 116 generates an update notification including the physical machine ID of the transmission source physical machine in a communication format for the physical machine already executing a VM in the same tenant. Then, the broadcast management unit 116 transmits the generated update notification to that physical machine (S19). After that, the processing is terminated.

FIG. 18 illustrates an example update notification. Data 1801 in FIG. 18 is an example update notification. The update notification includes an ether header, an IP header, a TCP header, and a vendor-specific format data. When the management mechanism type of the physical resource pool is OpenStack, as the data 1802, for example, the data in a vender-specific format includes an OpenstackHID and a tenant ID, and a physical machine ID, which are identification information to identify the processing. In the OpenstackHID, "updatePort" is set. When the management mechanism type of the physical resource pool is VMware, as the data 1803, for example, the data in a vender-specific format includes VMwareHID, a physical machine ID, and a tenant ID, which are identification information to identify the processing. In the VMwareHID, "updatePortInfo" is set. When a VM of some tenant is activated for the first time in the system, a region for strong the physical machine ID is blank.

With the execution of the above-described processing, the physical machine having transmitted the activation notification can specify the physical machine already executing a VM in the same tenant.

In the present embodiment, the network management unit 11 can convert the communication format. Accordingly, the case where the management mechanism type of the physical resource pool 80 is different from that of the physical resource pool 90 can be handled.

The update notification is transmitted only to the physical machine executing a VM in the same tenant. Accordingly, an unnecessary communication load does not occur.

Figure 19:
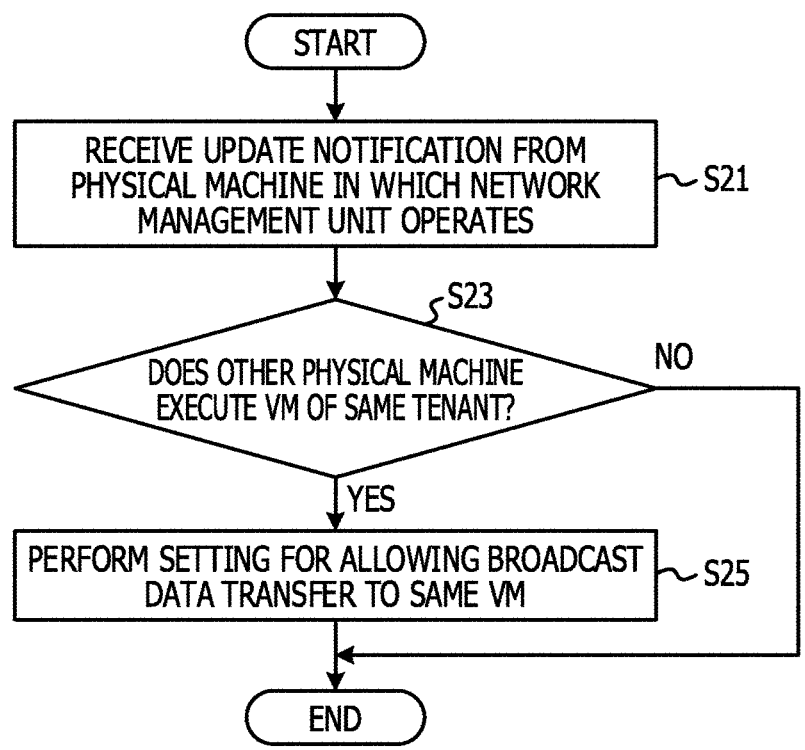
FIG. 19 is a flowchart of processing which is executed when the network processing unit receives the update notification.

Hereinafter, described by using FIG. 19 is processing which is executed when the network processing unit 41 receives the update notification. The processing by the network processing unit 41 is described as an example, but the network processing units 51, 61, and 71 also execute the same processing.

The communication unit 417 in the network processing unit 41 receives the update notification from the physical machine (the physical machine 10 here) in which the network management unit 11 operates (FIG. 19: S21). The communication unit 417 outputs the update notification to the management unit 416.

The management unit 416 determines if a VM in the same tenant is executed by a different physical machine depending on the update notification includes a physical machine ID (S23). When the different physical machine does not execute a VM in the same tenant (S23: No route), the broadcast data is not transmitted to the different physical machine. Thus, the processing is terminated.

On the other hand, when the different physical machine executes a VM in the same tenant (S23: Yes route), the management unit 416 instructs the policy setting unit 415 to execute the processing. In response to this, the policy setting unit 415 performs setting for allowing broadcast data to be transferred to the VM of the same tenant, which is executed by the different physical machine (S25). Specifically, the policy setting unit 415 specifies the tunnel port ID corresponding to the physical machine ID of the different physical machine from the third data storage unit 413. The policy setting unit 415 specifies the VM port ID corresponding to the tenant ID included in the update notification from the first data storage unit 411. After that, the policy setting unit 415 registers a MAC address of the VM coupled to the specified VM port and the specified tunnel port ID in the field of "1." in the data in FIG. 10. The management unit 416 stores a pair of the tenant ID and the physical machine ID included in the update notification in the second data storage unit 412. After that, the processing is terminated.

With the execution of the above-described processing, the physical machine having received the update notification becomes capable of transferring broadcast data to a VM which is newly activated and is in the same tenant.

Hereinafter, the processing of the present embodiment is described more specifically by using FIGS. 20 to 31.

In FIGS. 20 to 31, a system having physical machines 1 to 5 is described as an example. In this system, the physical machine 1 has a network management unit and the physical machine 2 has a server management unit.

As an initial setting, a tunnel port is generated in the physical machines 3 to 5. Specifically, each of the physical machines 3 to 5 associates a tunnel port ID with a physical machine ID.

After that, according to a request from the server management unit in the physical machine 2, a server processing unit in the physical machine 3 starts preparing for activating a VM 1. The server processing unit in the physical machine 3 requests the network management unit in the physical machine 1 to acquire a VM port ID. In response to this, the network management unit in the physical machine 1 assigns the VM port ID and transmits the VM port ID to the server processing unit in the physical machine 3. The server processing unit in the physical machine 3 generates a port for the VM 1 and starts activating the VM 1. The network management unit in the physical machine 1 centrally manages VM port IDs in the system.

Figure 20:
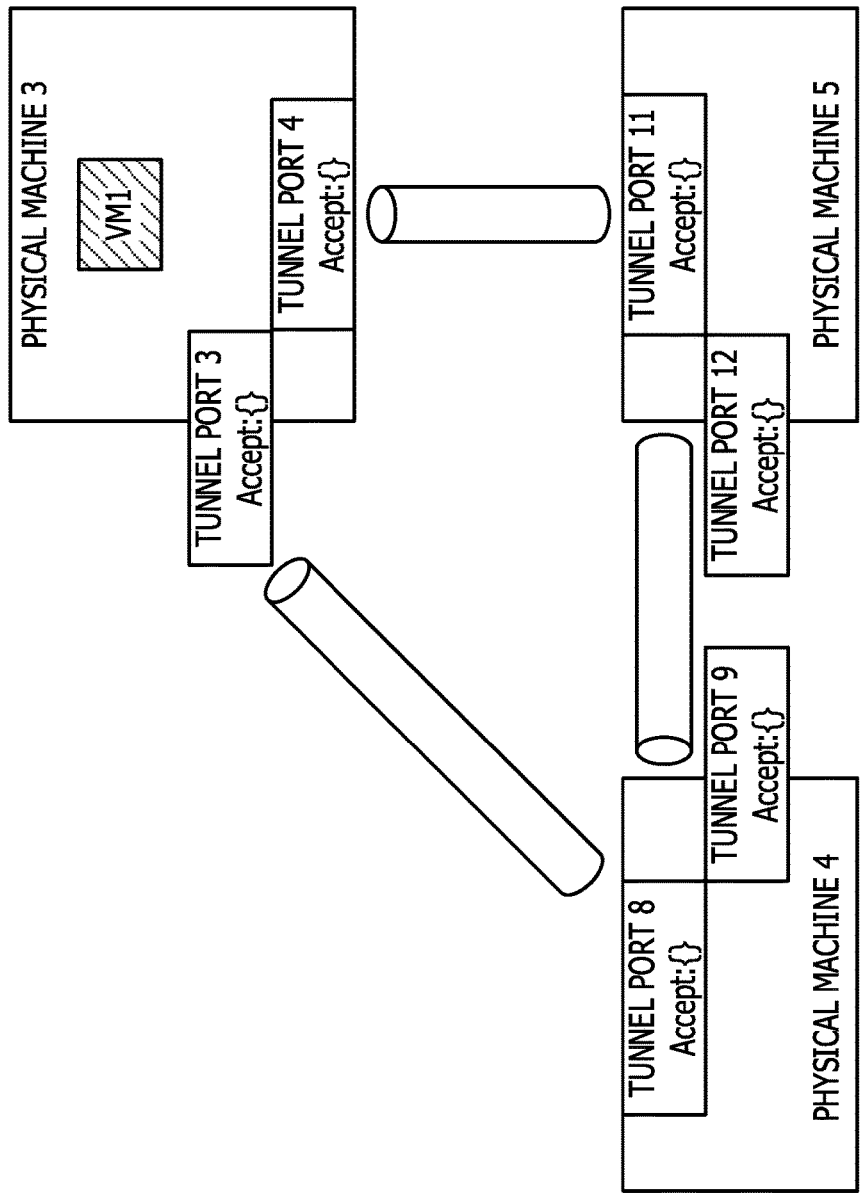
FIG. 20 is an example diagram of processing according to the present embodiment.

With the above-described setting, the state illustrated in FIG. 20 is obtained. In other words, a tunnel port 3 of the physical machine 3 establishes a tunnel with a tunnel port 8 of the physical machine 4. A tunnel port 4 of the physical machine 3 establishes a tunnel with a tunnel port 11 of the physical machine 5. A tunnel 9 of the physical machine 4 establishes a tunnel with a tunnel port 12 of the physical machine 5. In the physical machine 3, the VM 1 is activated. In FIG. 20, there is no tunnel port whose setting is made to allow broadcast data transfer. In other words, "Accept: "{ }"" is registered in the policy data storage unit.

Figure 21:
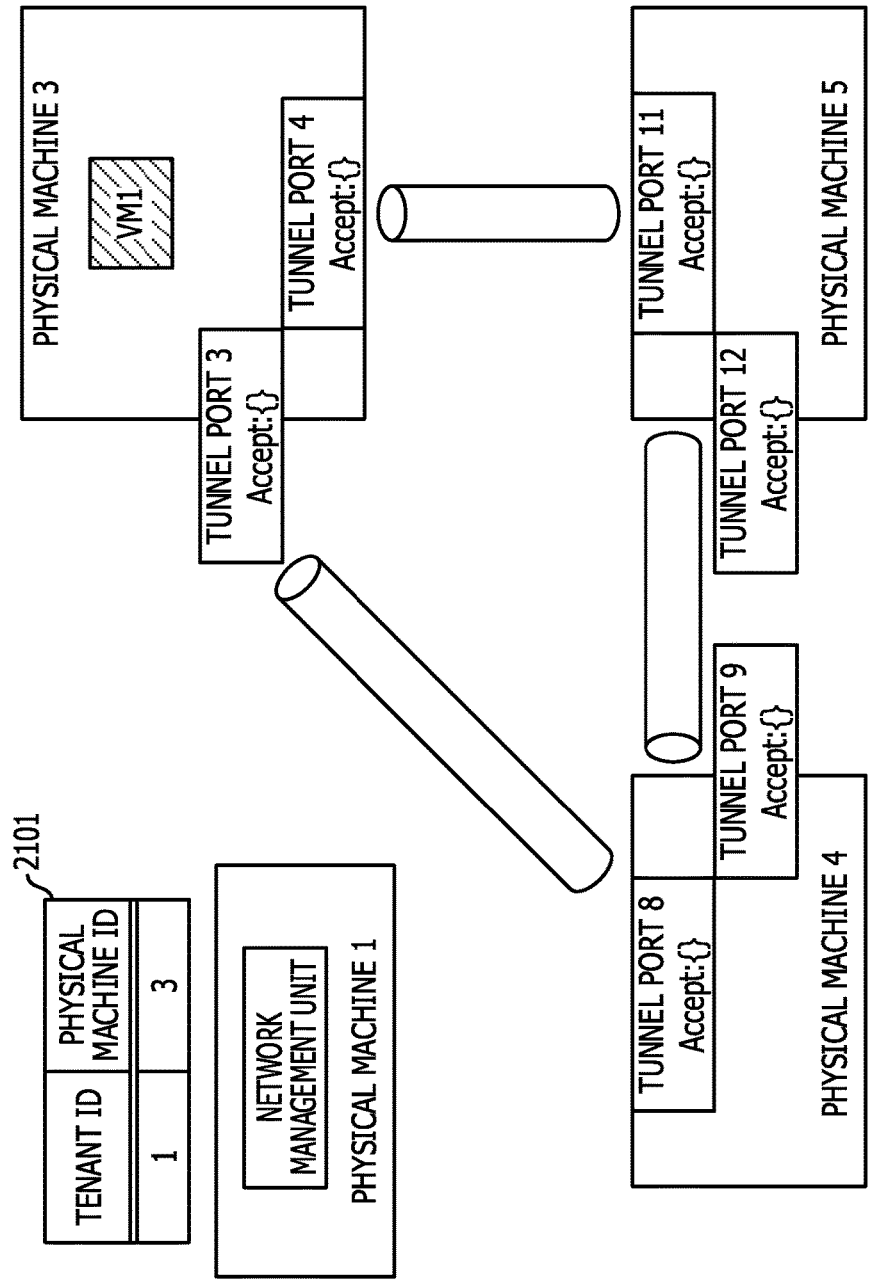
FIG. 21 is an example diagram of processing according to the present embodiment.

In the case of FIG. 20, the data stored in the second management data storage unit which is managed by the network management unit becomes like data 2101 in FIG. 21. Specifically, a tenant ID "1" and a physical machine ID "3" are stored in association with each other. In other words, the network management unit grasps that a VM whose tenant ID is 1 is activated in the physical machine 3.

Figure 22:
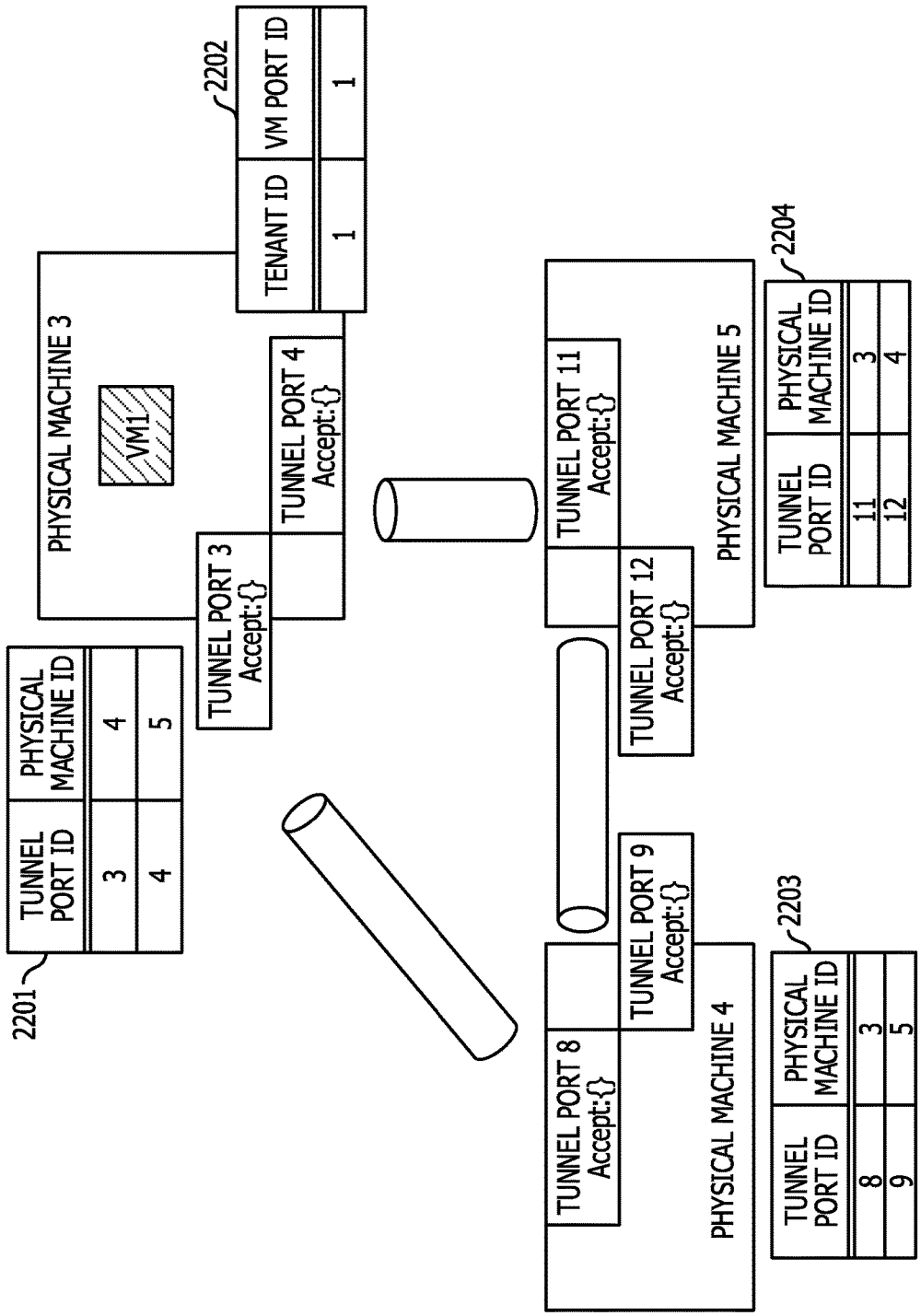
FIG. 22 is an example diagram of processing according to the present embodiment.

In the case of FIG. 20, the data managed by the physical machines 3 to 5 becomes like ones illustrated in FIG. 22. Specifically, data 2201 is stored in the third data storage unit of the physical machine 3. Data 2203 is stored in the third data storage unit of the physical machine 4. Data 2204 is stored in the third data storage unit of the physical machine 5. Data 2202 is stored in the first data storage unit of the physical machine 3.

Figure 23:
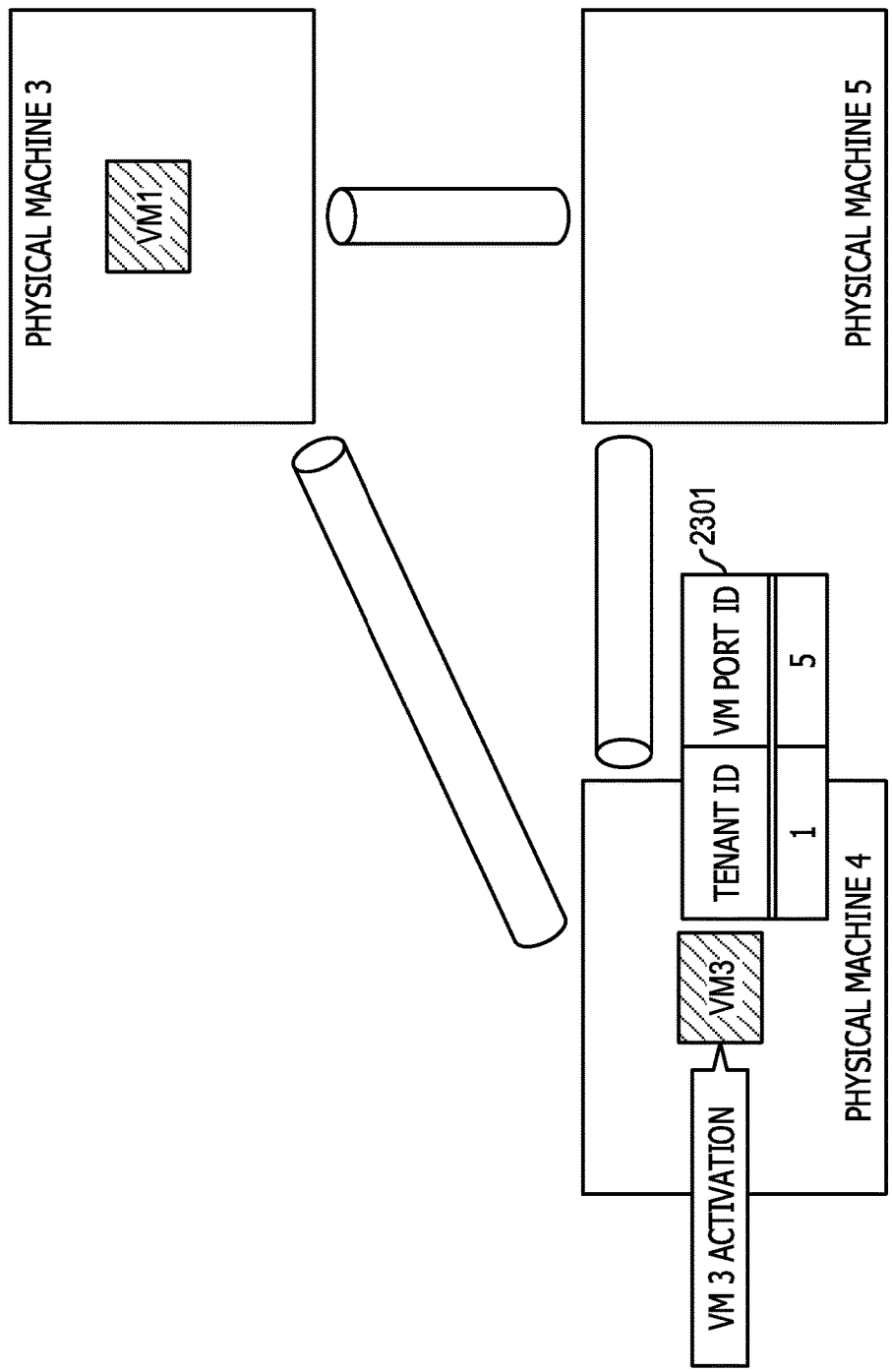
FIG. 23 is an example diagram of processing according to the present embodiment.

It is assumed here that, as illustrated in FIG. 23, a VM 3 whose tenant ID is 1 is activated in the physical machine 4. Then, data 2301 is stored in the first data storage unit of the physical machine 4 by the processing performed by the network processing unit.

Figure 24:
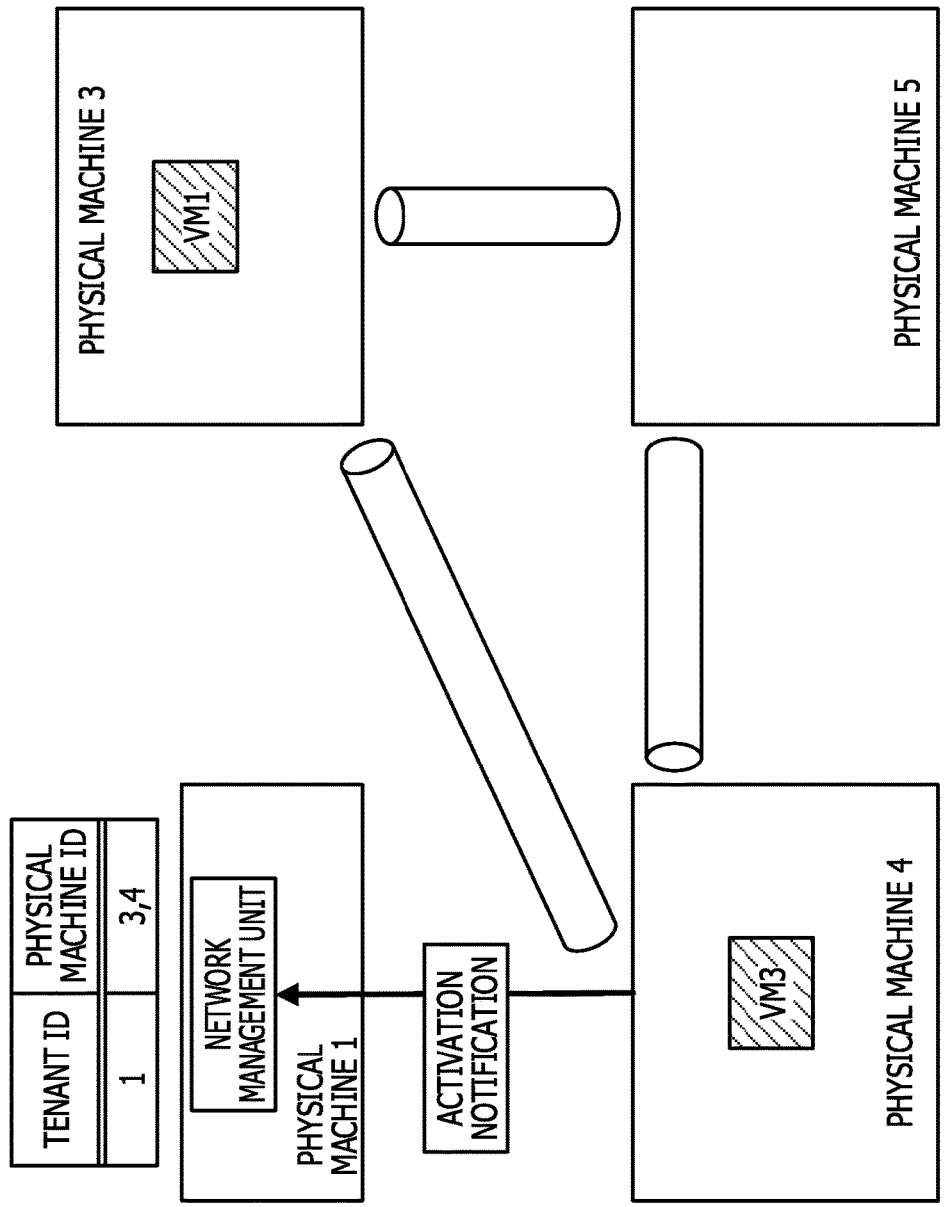
FIG. 24 is an example diagram of processing according to the present embodiment.

After that, as illustrated in FIG. 24, the physical machine 4 transmits an activation notification including the tenant ID of the tenant using the VM 3 and the physical machine ID of the physical machine 4 to the physical machine 1. In response to this, the network management unit of the physical machine 1 stores the physical machine ID "4" in the second management data storage unit in association with the tenant ID "1."

Figure 25:
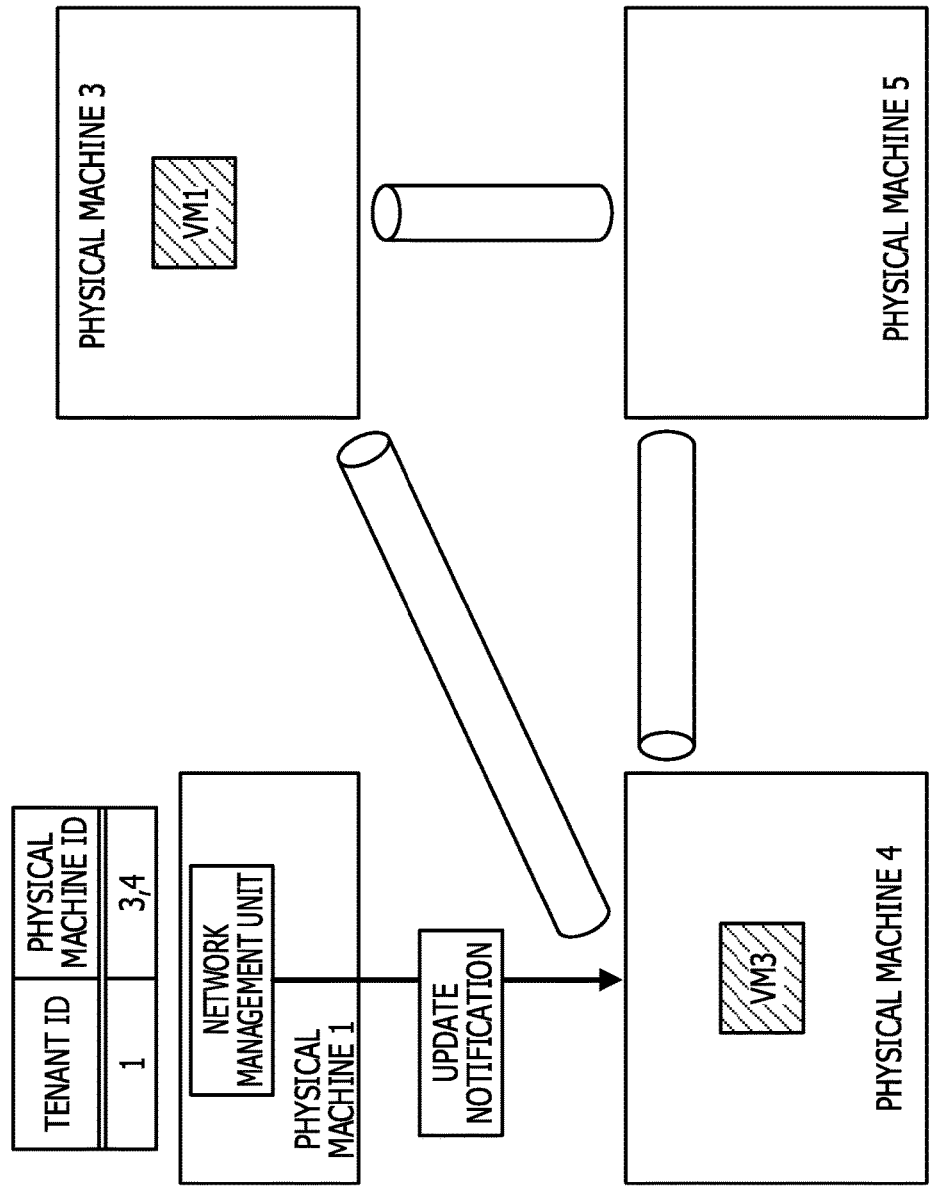
FIG. 25 is an example diagram of processing according to the present embodiment.

As illustrated in FIG. 25, the physical machine 1 transmits an update notification including the tenant ID "1" and the physical machine ID "3" to the physical machine 4. Accordingly, the physical machine 4 becomes capable of grasping that the physical machine 3 is executing the VM whose tenant is same as that of the VM 3.

Figure 26:
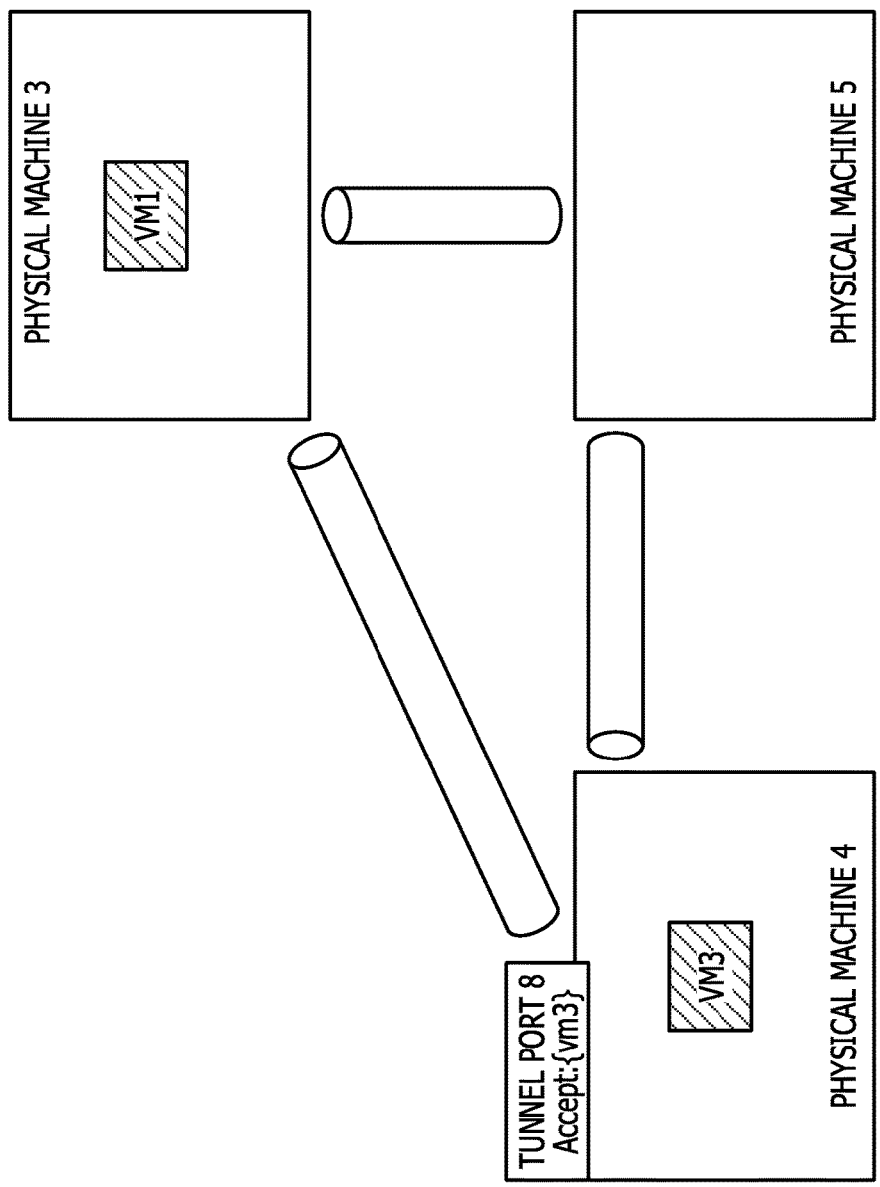
FIG. 26 is an example diagram of processing according to the present embodiment.

As illustrated in FIG. 26, the physical machine 4 changes the policy for the tunnel port 8. In other words, the setting is changed in the policy data storage unit so that the tunnel port 8 transfers broadcast data from the VM 3.

Figure 27:
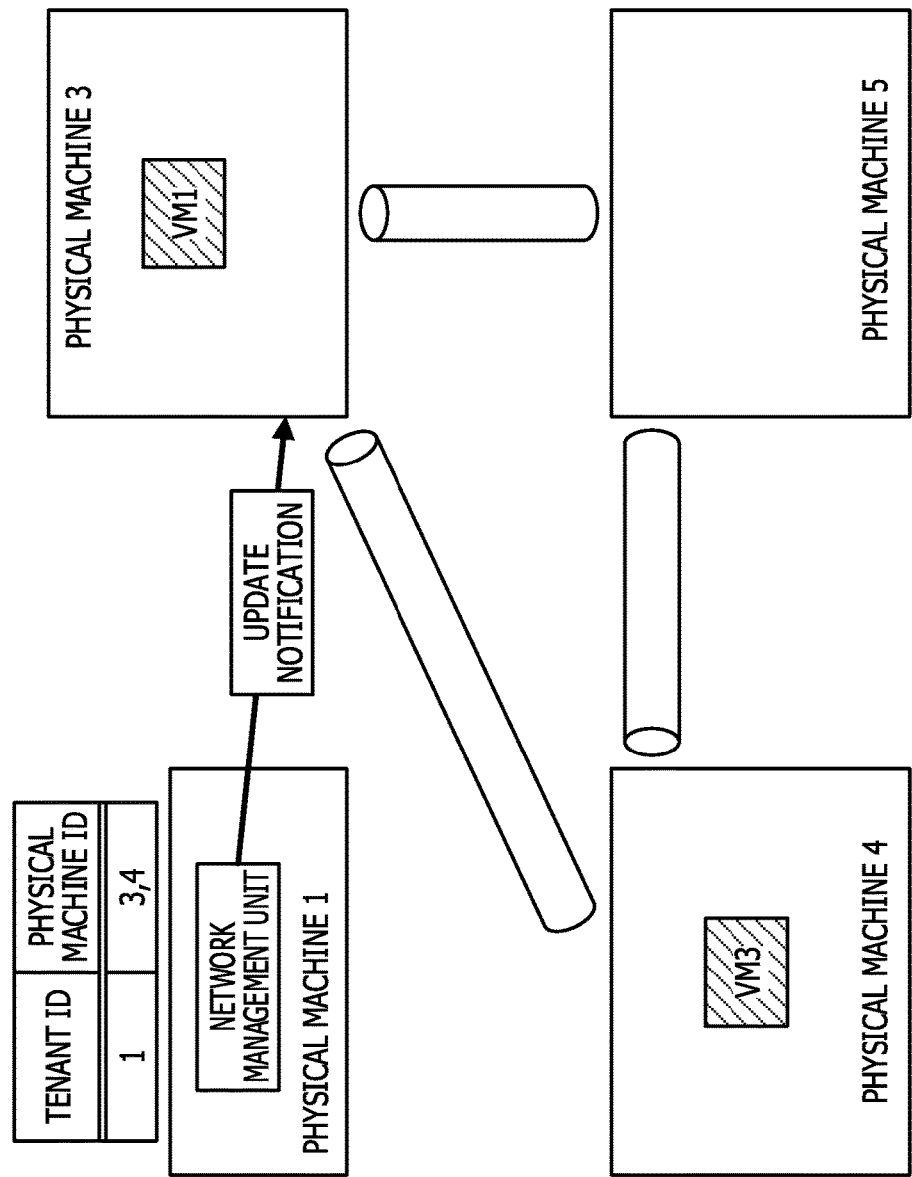
FIG. 27 is an example diagram of processing according to the present embodiment.

On the other hand, as illustrated in FIG. 27, the physical machine 1 transmits the update notification including the tenant ID "1" and the physical machine ID "4" to the physical machine 3. Accordingly, the physical machine 3 becomes possible of grasping that the physical machine 4 is executing the VM whose tenant is same as that of the VM 1.

Figure 28:
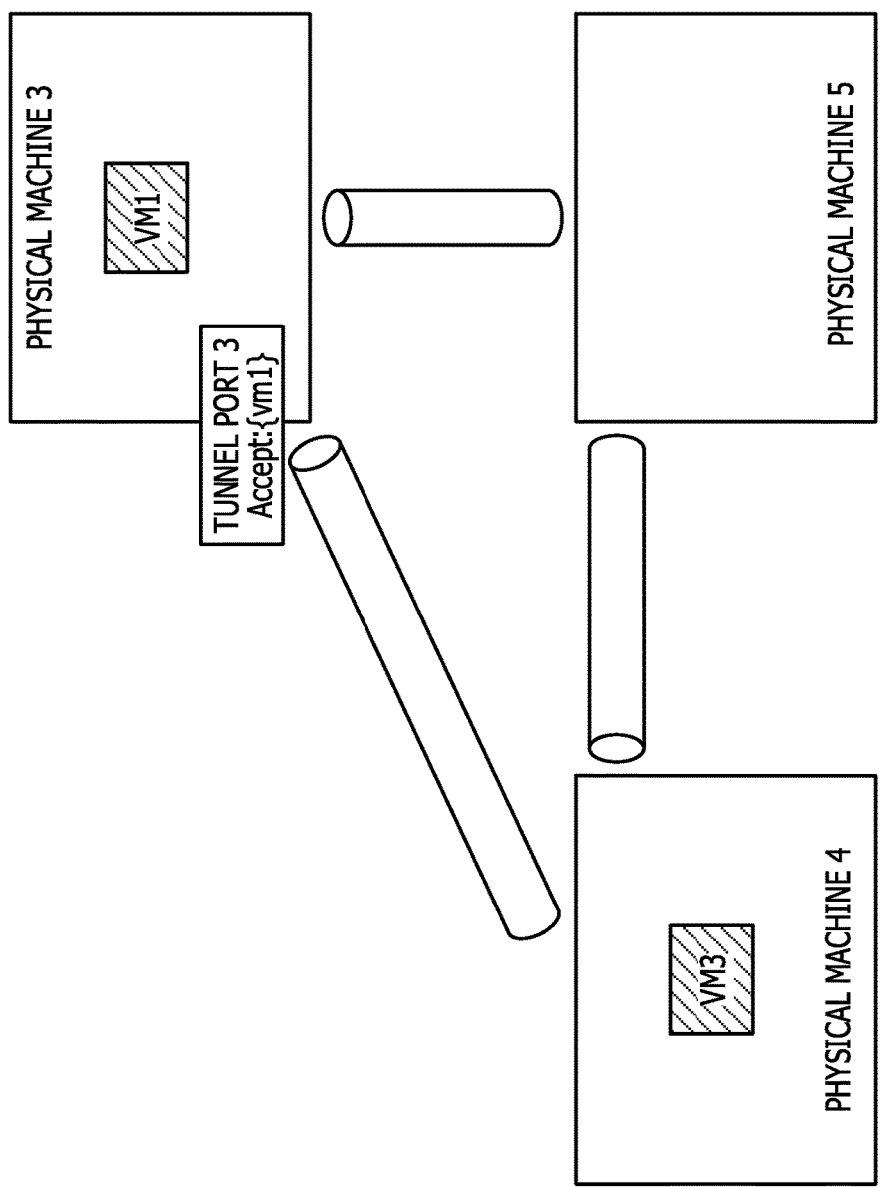
FIG. 28 is an example diagram of processing according to the present embodiment.

As illustrated in FIG. 28, the physical machine 3 changes the policy for the tunnel port 3. In other words, the setting is changed in the policy data storage unit so that the tunnel port 3 transfers broadcast data from the VM 1.

Figure 29:
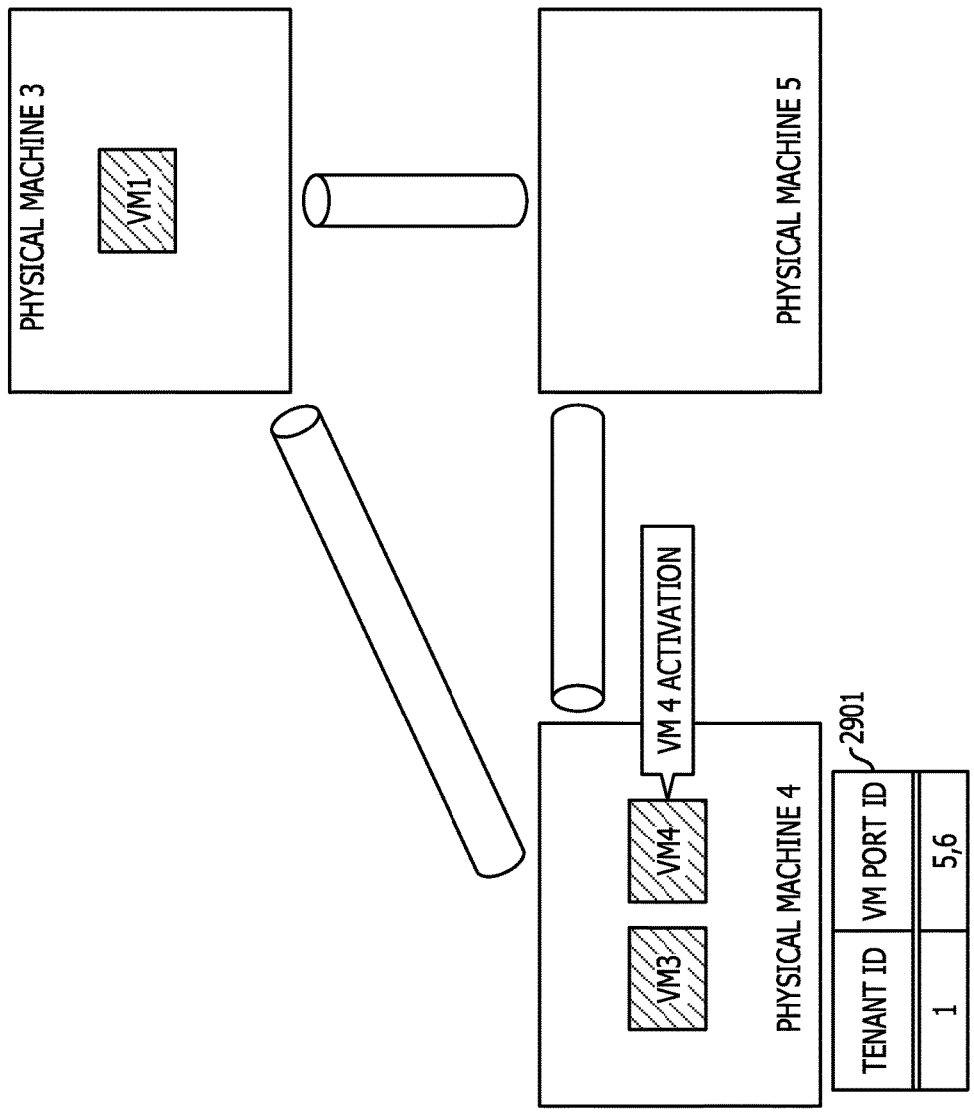
FIG. 29 is an example diagram of processing according to the present embodiment.

It is assumed here that, as illustrated in FIG. 29, in the physical machine 4, a VM 4 whose tenant ID is 1 is activated. Then, data 2901 is stored in the first data storage unit of the physical machine 4 by the processing performed by the network processing unit.

Figure 30:
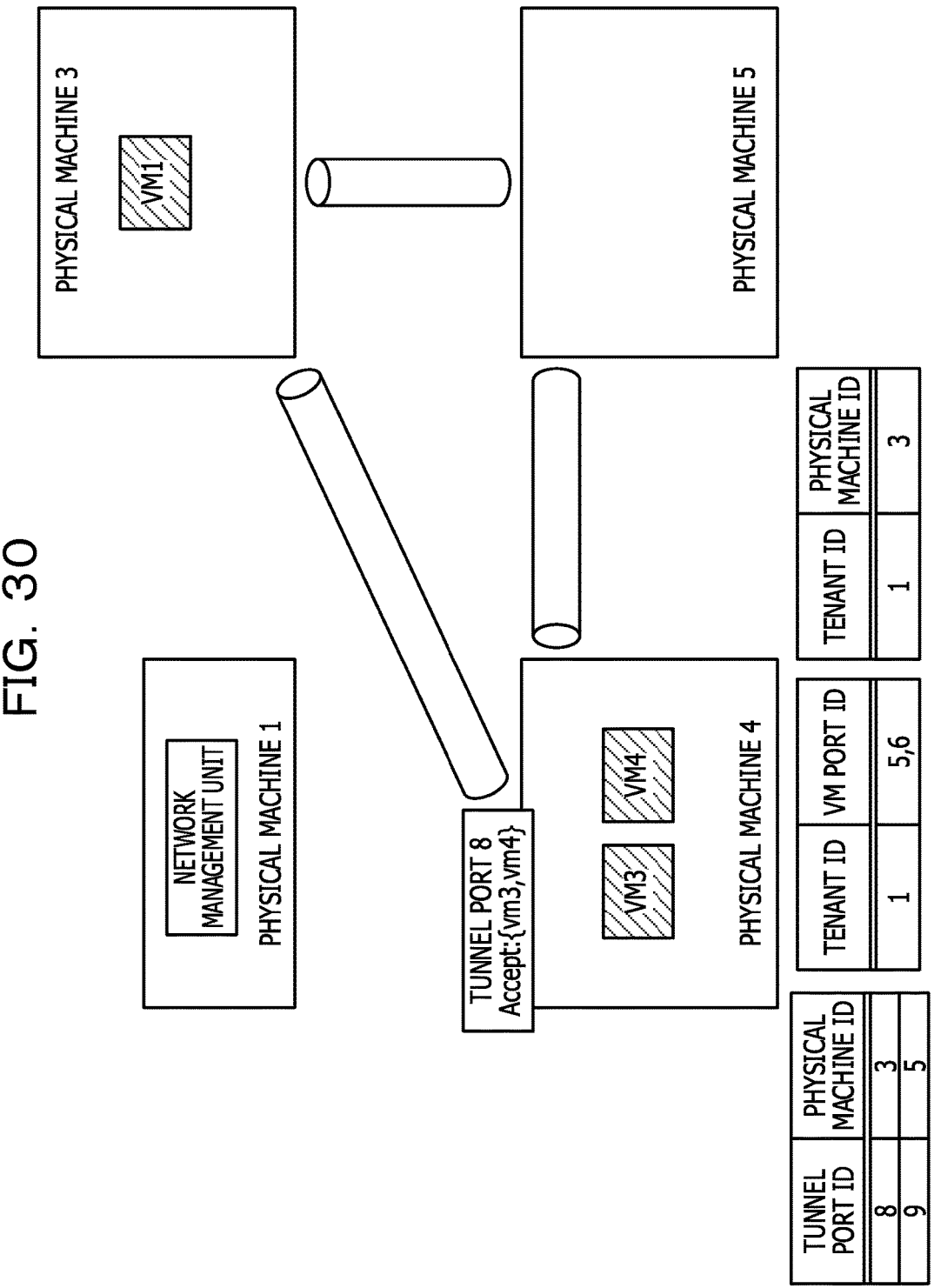
FIG. 30 is an example diagram of processing according to the present embodiment.

In this case, the VM 3 whose tenant ID is "1" is executed in the physical machine 4, and, thus, an activation notification is not transmitted. As illustrated in FIG. 30, the policy for the tunnel port 8 is changed. In other words, the setting is changed in the policy data storage unit so that the tunnel port 8 transfers broadcast data from the VM 4.

Figure 31:
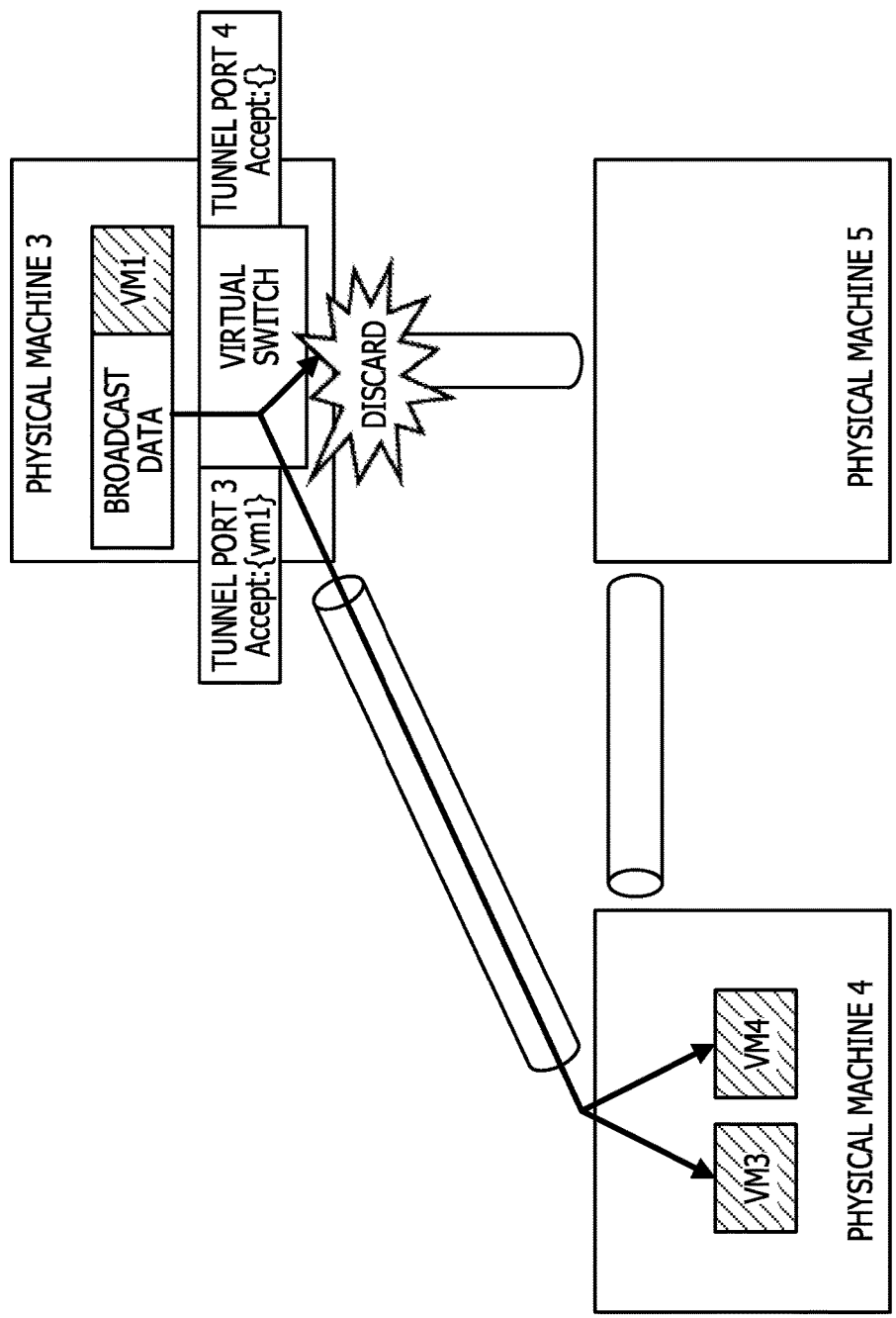
FIG. 31 is an example diagram of processing according to the present embodiment.

With the execution of the above-described processing, the broadcast data transmitted by the VM 1 in the physical machine 3 is transmitted as illustrated in FIG. 31. In other words, a virtual switch of the physical machine 3 transfers the broadcast data only to the tunnel port 3 and does not transfer it to the tunnel port 4. Accordingly, the broadcast data is not transmitted to the physical machine in which the VM whose tenant ID is 1 does not exist. Consequently, unnecessary communication traffic does not occur, and, thus, a processing load of a physical machine in a data transfer destination does not increase.

Figure 32:
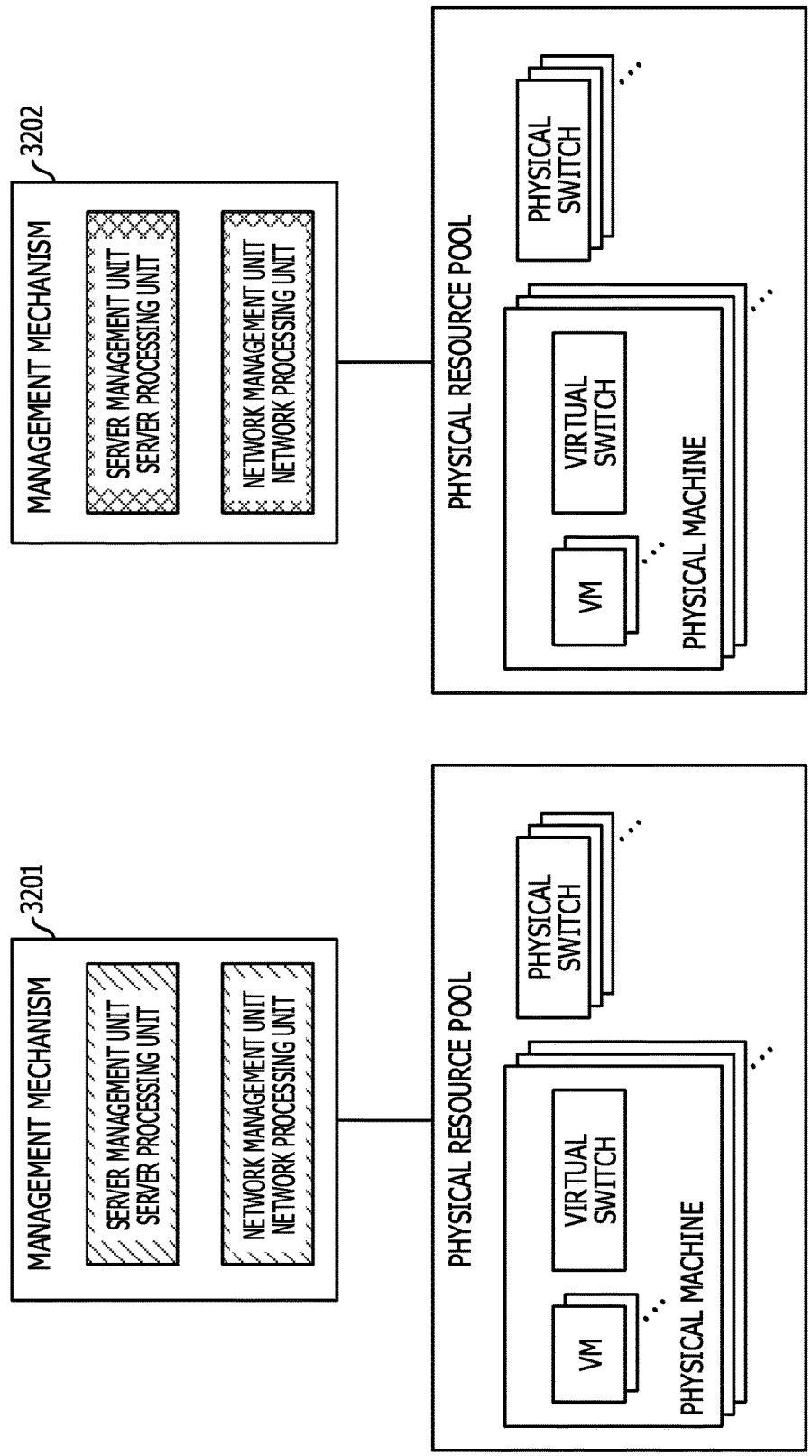
FIG. 32 is an example diagram of a system in the present embodiment in a case where a network management unit is not provided.

According to the processing in the present embodiment, as described above, it becomes possible to handle the case where management mechanism types of the physical resource pools are different. This will be described later by using FIG. 32. In FIG. 32, the network management unit 11 which can convert the communication format does not exist. Accordingly, a management mechanism is provided in each of the physical resource pools. The management mechanism includes a server management unit, a server processing unit, a network management unit, and a network processing unit. In this case, communications are performed between the network management units, which results in causing unnecessary traffic. This means that protocol is defined between the network management units whose types are different. On the other hand, with the processing of the present embodiment, there is no communication between the network management units and there is no communication between the network management unit and the server management unit, so that a communication amount can be reduced.

Second Embodiment

Figure 33:
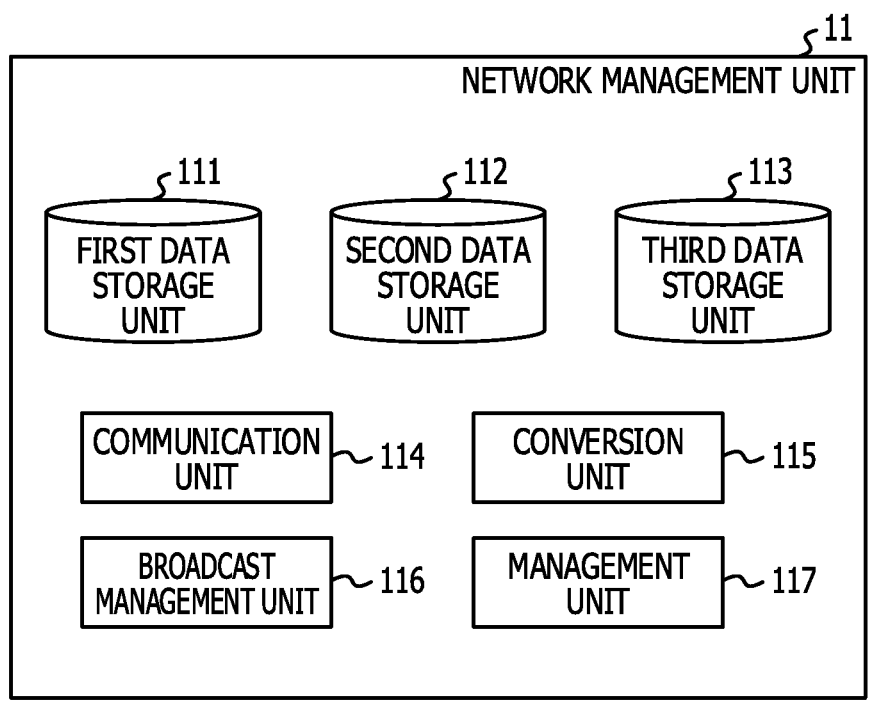
FIG. 33 is a functional block diagram of a network management unit in a second embodiment.

Hereinafter, a second embodiment is described. In the second embodiment, systems of tenant IDs which are used by physical machines are not integrated. For example, there is a case where a tenant having a tenant ID of 1 in a physical resource pool 80 is not same as a tenant having a tenant ID of 1 in a physical resource pool 90. For this reason, in the second embodiment, as illustrated in FIG. 33, a network management unit 11 has a third management data storage unit 113 in addition to the components described in the first embodiment.

FIG. 34 illustrates an example data stored in the third management data storage unit 113. In the example of FIG. 34, tenant IDs and island-tenant IDs are stored in the third management unit 113. In this embodiment, an island means a physical resource pool. For example, data on the first row indicates that the tenant whose tenant ID is 1 in the island 1 and the tenant whose tenant ID is 3 in the island 2 are the same tenant. Also, the data indicates that the network management unit 11 assigns the tenant ID "1" to the same tenant.

Figure 35:
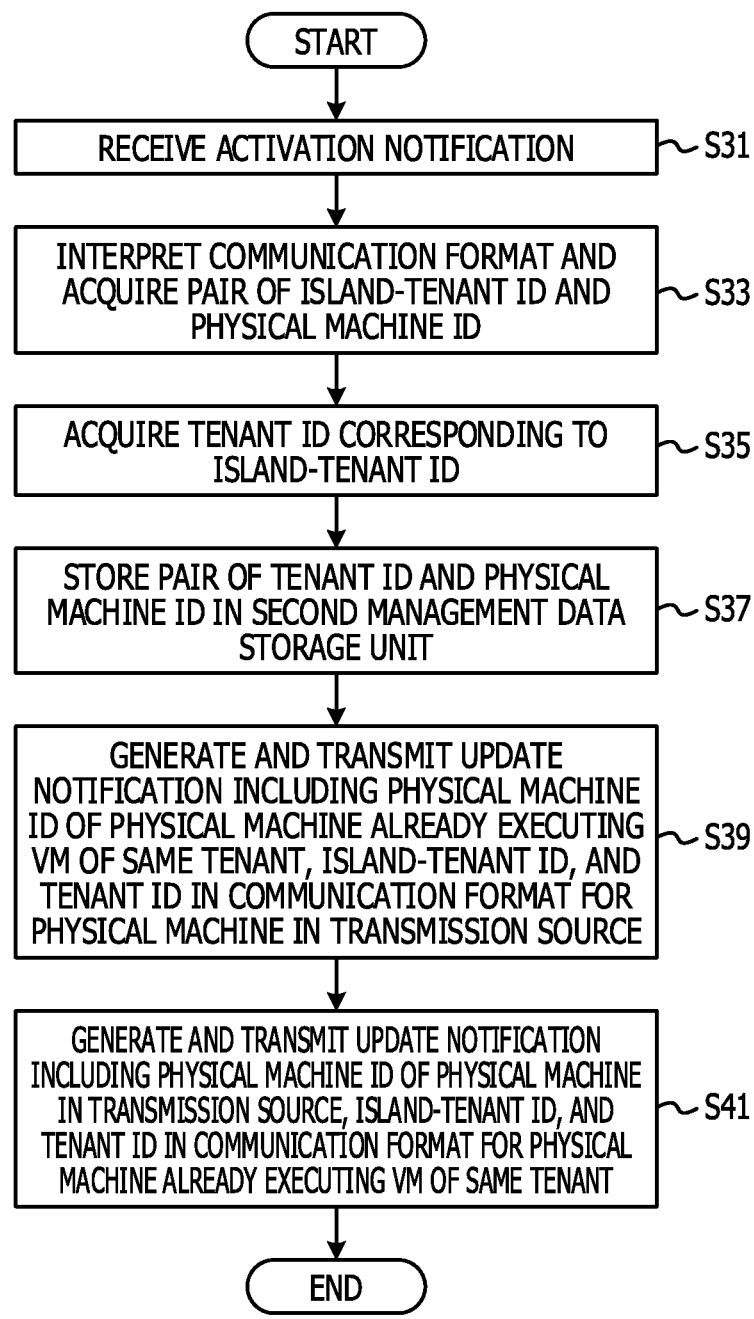
FIG. 35 is a flowchart of processing in the second embodiment, which is executed when the network management unit receives an activation notification.

Next, described by using FIG. 35 is processing which is executed by the network management unit 11 in the second embodiment. A communication unit 114 in the network management unit 11 receives an activation notification (FIG. 35: S31). Then, the communication unit 114 outputs the received activation notification to a conversion unit 115. Thereafter, the conversion unit 115 interprets a communication format of the activation notification. The conversion unit 115 acquires a pair of an island-tenant ID and a physical machine ID from the activation notification (S33). The conversion unit 115 outputs the acquired pair of the island-tenant ID and the physical machine ID to the broadcast management unit 116.

The broadcast management unit 116 acquires the tenant ID corresponding to the acquired island-tenant ID from the third management data storage unit 113 (S35).

The broadcast management unit 116 stores the acquired pair of the tenant ID and the physical machine ID in the second management data storage unit 112 (S37). When the same tenant ID is already stored, the broadcast management unit 116 reads the physical machine ID stored in association with the tenant ID and stores the acquired physical machine ID in association with the tenant ID.

The broadcast management unit 116 generates an update notification in a communication format for a physical machine in a transmission destination of the activation notification, the update notification including the read physical machine ID (or the physical machine ID of the physical machine already executing a VM in the same tenant), an island-tenant ID, and a tenant ID. After that, the broadcast management unit 116 transmits the generated update notification to the transmission source physical machine (S39). When the same tenant ID is not stored in the second management data storage unit 112, the broadcast management unit 116 generates an update notification without a physical machine ID.

Of the island-tenant ID stored in the first data storage unit and the island-tenant ID stored in the second data storage unit, the transmission source physical machine having received the update notification overwrites the island-tenant ID included in the update notification with the tenant ID included in the update notification.

The broadcast management unit 116 generates an update notification including the physical machine ID of the transmission source physical machine, the island-tenant ID, and the tenant ID in a communication format for a physical machine already executing a VM in the same tenant. Then, the broadcast management unit 116 transmits the generated update notification to the physical machine (S41). After that, the processing is terminated.

Of the island-tenant ID stored in the first data storage unit and the island-tenant ID stored in the second data storage unit, the physical machine having received the update notification overwrites the island-tenant ID included in the update notification with the tenant ID included in the update notification.

With the execution of the above-described processing, it becomes possible to handle the case where systems of tenant IDs which are used by each of the physical machines are not integrated.

The embodiment of the present disclosure is described as above. However, the present disclosure is not limited to this. For example, the functional block configurations of the above-described network management unit 11, network processing unit 41, and virtual switch 43 are not typically same as the actual program module configurations.

The above-described configuration of each table is simply an example, and the above-described configuration is not typically used. Furthermore, as long as the processing result does not change, the order of the processes may be changed and a parallel execution is also possible.

The filtering based on the MAC address is performed above, but filtering based on an ID of a virtual local area network (VLAN) may be performed.

Figure 36:
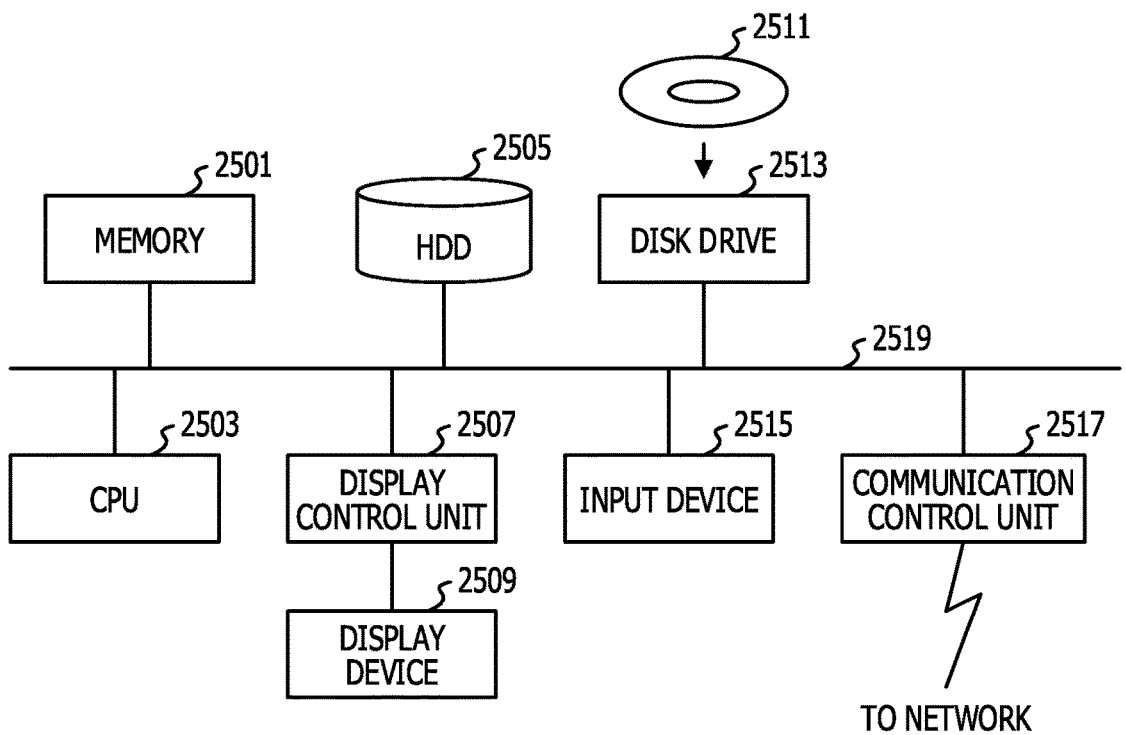
FIG. 36 is a functional block diagram of a computer.

The above-described physical machines 10, 20, 30, 40, 50, 60, and 70 are a computer device. As illustrated in FIG. 36, a bus 2519 connects a memory 2501, a central processing unit (CPU) 2503, a hard disk drive (HDD) 2505, a display control unit 2507 coupled to a display device 2509, a drive device 2513 for a removable disk 2511, an input device 2515, and a communication control unit 2517 for connecting with a network. The HDD 2505 stores an operating system (OS) and an application program for performing processing in the embodiment. The application program is read from the HDD 2505 to the memory 2501 when it is executed by the CPU 2503. Depending on the processing content of the application program, the CPU 2503 controls the display control unit 2507, the communication control unit 2517, and the drive device 2513 to perform a predetermined operation. The data in process is mainly stored in the memory 2501, but it may be stored in the HDD 2505. In the embodiment of the present disclosure, the application program for executing the above-described processing is stored in a computer readable removable disk 2511 and then distributed. After that, the application program is installed from the drive device 2513 to the HDD 2505. The application program may be installed in the HDD 2505 through a network such as the Internet and the communication control unit 2517. Such a computer device achieves various types of functions as described above by coordinated cooperation of hardware such as the CPU 2503 and the memory 2501 and programs such as the OS and the application.

The above-described embodiment can be summed up as follows.

An information processing system according to a first aspect of the present embodiment has multiple information processing devices. Of the multiple information processing devices, a first information processing device includes (A) a data storage unit configured to store identification information of a tenant in association with identification information of an information processing device executing a virtual machine of the tenant; (B) an extraction unit configured to extract identification information of a third information processing device, which is stored in association with identification information of a first tenant, from the data storage unit when it is detected that a virtual machine of the first tenant is activated in a second information processing device of the multiple information processing devices; and (C) a first transmission unit configured to transmit the extracted identification information of the third information processing device to the second information processing device. Then, the second information processing device includes (D) a first relay processing unit and (E) a first setting unit configured to perform setting on the first relay processing unit for allowing a virtual machine of the first tenant to transmit broadcast data to the third information processing device when the identification information of the third information processing device is received.

In this manner, the setting is made so that transmission of broadcast data is only allowed to an information processing device executing a virtual machine in the same tenant. Accordingly, the relay processing unit can properly perform filtering on the broadcast.

The above-described first transmission unit transmits (c1) identification formation of the second information processing device to the third information processing device, and the third information processing device may include (F) a second relay processing unit and (G) a second setting unit to perform setting on the second relay processing unit for allowing the virtual machine of the first tenant to transmit broadcast data to the second information processing device when the identification information of the second information processing device is received. In this manner, the virtual machine of the same tenant in a different information processing device becomes capable of transmitting broadcast data to the activated virtual machine.

The above-described first setting unit may include (e1) a determination unit to determine if a different virtual machine of the first tenant is already executed when the virtual machine of the first tenant is activated in the second information processing device, and (e2) a second transmission unit to transmit the identification information of the first tenant to the first information processing device when the different virtual machine of the first tenant is not executed. When the different virtual machine is already executed, the setting for the same tenant is already made for the first relay processing unit. Accordingly, with the above-described configuration, unnecessary communications with the first information processing device are removed.

The above-described first transmission unit may store (c2) the identification information of the second information processing device in association with the identification information of the first tenant in the data storage unit. In this manner, even in a case where a different virtual machine is further activated, filtering can be properly performed on the broadcast.

A control method according to a second aspect of the present embodiment includes (H) extracting identification information of an information processing device, which is stored in association with identification information of a first tenant, from a data storage unit to store the identification information of the tenant in association with the identification information of the information processing device executing a virtual machine of the tenant when it is detected that the virtual machine of the first tenant is activated in a different information processing device and (I) transmitting the extracted identification information of the information processing device to the second information processing device.

A program for causing a computer to perform the processing by the above-described control method can be generated. The program is stored in a computer-readable storage medium or a storage device, such as a flexible disk, a CD-ROM, a magneto-optical disk, a semiconductor memory or a hard disk. It is noted that intermediate processing results are temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method by an information processing system including a plurality of computers, the plurality of computers including a first computer, a second computer, and a third computer, the control method comprising:

storing, by the first computer, identification information of a user and identification information of a computer among the plurality of computers in association with each other in a memory, the computer executing a software of the user, the software being related to a virtual machine;

extracting, by the first computer, identification information of the third computer already executing the software of a target user from the memory based on identification information of the target user, when it is detected that the software of the target user is activated in the second computer and when identification information of the target user is stored in the memory;

transmitting, by the first computer, the extracted identification information of the third computer to the second computer;

receiving, by the second computer, the identification information of the third computer from the first computer;

allowing, by the second computer, the second computer to transmit broadcast data corresponding to the software of the target user to the third computer, when the broadcast data is received;

determining, by the second computer, whether another software which is different from the target user, is already executed in the second computer when the software of the target user is activated in the second computer; and transmitting, by the second computer, an activation notification including the identification information of the target user and identification information of the second computer to the first computer, when it is determined that the another software is not already executed.

2. The control method according to claim 1, further comprising:

transmitting, by the first computer, identification information of the second computer to the third computer; and allowing, by the third computer, the third computer to transmit the broadcast data to the second computer, when the broadcast data is received.

3. The control method according to claim 1, wherein the extracting includes detecting, by receiving the activation notification from the second computer, that the software of the target user is activated in the second computer.

4. The control method according to claim 1, wherein the extracting includes:
acquiring, from the activation notification, the identification information of the target user and the identification information of the second computer; and
reading out the identification information of the third computer stored in association with the identification information of the target user from the memory.

5. The control method according to claim 1, wherein the transmitting includes:
generating a first update notification including the identification information of the third computer in a communication format for the second computer; and
transmitting the generated first update notification to the second computer.

6. The control method according to claim 5, wherein the transmitting includes:
generating a second update notification including the identification notification of the second computer in a communication format for the third computer; and
transmitting the generated second update notification to the third computer.

7. The control method according to claim 1, further comprising:
generating, by the first computer, a second update notification without identification information of a user, when it is detected that the software of the target user is activated in the second computer and when the identification information of the target user is not stored in the memory; and
transmitting, by the first computer, the generated second update notification to the second computer.

8. An information processing system, comprising:
a first computer; and
a second computer coupled to the first computer,
wherein the first computer includes:
a first memory, and
a first processor coupled to the first memory and configured to:
store, in the first memory, identification information of a user and identification information of a computer executing a software of the user in association with each other, the software being related to a virtual machine;
extract, from the first memory, identification information of a third computer already executing the software of a target user based on identification information of the target user, when it is detected that the software of the target user is activated in the second computer and when identification information of the target user is stored in the first memory; and
transmit the extracted identification information of the third computer to the second computer,
wherein the second computer includes:
a second memory; and
a second processor coupled to the second memory and configured to:
receive the identification information of the third computer from the first computer;

allow the second computer to transmit broadcast data corresponding to the software of the target user to the third computer, when broadcast data is received;
determine whether another software which is different from the target user is already executed in the second computer when the software of the target user is activated in the second computer; and
transmit an activation notification including the identification information of the target user and identification information of the second computer to the first computer, when it is determined that the another software is not already executed.

9. The information processing system according to claim 8, wherein the first processor is configured to detect, by receiving the activation notification from the second computer, that the software of the target user is activated in the second computer.

10. The information processing system according to claim 8, wherein the first processor is configured to:
acquire, from the activation notification, the identification information of the target user and the identification information of the second computer; and
read out the identification information of the third computer stored in association with the identification information of the target user from the first memory.

11. The information processing system according to claim 8, wherein the first processor is configured to:
generate a first update notification including the identification information of the third computer in a communication format for the second computer; and
transmit the generated first update notification to the second computer.

12. The information processing system according to claim 8, wherein
the first computer is configured to transmit identification information of the second computer to the third computer; and
the third computer is configured to allow the third computer to transmit the broadcast data to the second computer, when the broadcast data is received.

13. The information processing system according to claim 8, wherein the first computer is configured to:
generate a first update notification including the identification information of the third computer in a communication format for the second computer; and
transmit the generated first update notification to the second computer.

14. The information processing system according to claim 13, wherein the first computer is configured to:
generate a second update notification including the identification notification of the second computer in a communication format for the third computer; and
transmit the generated second update notification to the third computer.

15. The information processing system according to claim 8, wherein the first computer is configured to:
generate a second update notification without identification information of a user, when it is detected that the software of the target user is activated in the second computer and when the identification information of the target user is not stored in the memory; and
transmit the generated second update notification to the second computer.

16. A non-transitory computer-readable recording medium storing a program causing a second computer to execute a process, second computer being coupled to a first computer that includes a first memory, and a first processor coupled to the first memory and configured to store, in the first memory, identification information of a user and identification information of a computer executing a software of the user in association with each other, the software being related to a virtual machine; extract, from the first memory, identification information of a third computer already executing the software of a target user based on identification information of the target user, when it is detected that the software of the target user is activated in the second computer and when identification information of the target user is stored in the first memory; and transmit the extracted identification information of the third computer to the second computer, the process comprising:

receiving the identification information of the third computer from the first computer;

allowing the second computer to transmit broadcast data corresponding to the software of the target user to the third computer, when the broadcast data is received;

determining whether another software which is different from the target user is already executed in the second computer when the software of the target user is activated in the second computer; and transmitting an activation notification including the identification information of the target user and identification information of the second computer to the first computer, when it is determined that the another software is not already executed.

* * * * *